United States Patent
Kaseda et al.

(10) Patent No.: US 9,635,001 B2
(45) Date of Patent: Apr. 25, 2017

(54) RE-ENCRYPTION SYSTEM, RE-ENCRYPTION APPARATUS, AND PROGRAM

(71) Applicants: Kabushiki Kaisha Toshiba, Minato-ku (JP); Toshiba Solutions Corporation, Kawasaki-shi (JP)

(72) Inventors: Yuki Kaseda, Kawasaki (JP); Takuya Yoshida, Inagi (JP); Yoshihiro Fujii, Tokyo (JP); Shingo Abe, Kawasaki (JP); Masataka Yamada, Fuchu (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 283 days.

(21) Appl. No.: 14/274,234

(22) Filed: May 9, 2014

(65) Prior Publication Data
US 2016/0119292 A1 Apr. 28, 2016

Related U.S. Application Data

(63) Continuation of application No. PCT/JP2012/078028, filed on Oct. 30, 2012.

(30) Foreign Application Priority Data

Nov. 9, 2011 (JP) .................. 2011-245618

(51) Int. Cl.
*H04L 9/00* (2006.01)
*H04L 29/06* (2006.01)
(Continued)

(52) U.S. Cl.
CPC ........ *H04L 63/045* (2013.01); *G06F 21/6218* (2013.01); *H04L 9/0825* (2013.01);
(Continued)

(58) Field of Classification Search
CPC ... H04L 63/045; H04L 9/0825; H04L 9/0833; H04L 9/14; H04L 63/0464; H04L 63/062; H04L 2209/76; G06F 21/6218
See application file for complete search history.

(56) References Cited

U.S. PATENT DOCUMENTS 5,787,175 A * 7/1998 Carter ................. G06F 21/6209
707/999.008
5,862,346 A * 1/1999 Kley ...................... G06Q 10/10
709/200

(Continued)

FOREIGN PATENT DOCUMENTS

JP 2007-80145 A 3/2007
JP 4061288 B2 12/2007

OTHER PUBLICATIONS

Extended European Search Report issued Jun. 8, 2015 in Patent Application No. 12848411.0.
(Continued)

*Primary Examiner* — Taghi Arani
*Assistant Examiner* — Sharon Lynch
(74) *Attorney, Agent, or Firm* — Oblon, McClelland, Maier & Neustadt, L.L.P.

(57) ABSTRACT

A re-encryption system according to this embodiment includes a file sharing apparatus and a re-encryption apparatus. Upon receiving a file request from the client apparatus, the file sharing apparatus acquires a first encrypted file based on the file request, and transmits a re-encryption request including the first encrypted file to the re-encryption apparatus. The re-encryption apparatus re-encrypts the first encrypted file included in the re-encryption request to the second encrypted file based on the re-encryption key, and transmits the second encrypted file to the file sharing apparatus. The file sharing apparatus transmits the second encrypted file to the client apparatus. The client apparatus
(Continued)

obtains the file by decrypting the second encrypted file based on a private key corresponding to the public key of the member.

6 Claims, 22 Drawing Sheets

(51) Int. Cl.
*H04L 9/08* (2006.01)
*H04L 9/14* (2006.01)
*G06F 21/62* (2013.01)

(52) U.S. Cl.
CPC .............. *H04L 9/0833* (2013.01); *H04L 9/14* (2013.01); *H04L 63/0464* (2013.01); *H04L 63/062* (2013.01); *H04L 2209/76* (2013.01)

(56) References Cited

U.S. PATENT DOCUMENTS

| | | | | |
|---|---|---|---|---|
| 5,940,507 A * | 8/1999 | Cane | ..................... | G06F 21/602 380/277 |
| 7,178,021 B1 * | 2/2007 | Hanna | .................. | G06F 21/6209 713/150 |
| 7,181,017 B1 * | 2/2007 | Nagel | .................... | H04L 9/0825 380/282 |
| 7,509,492 B2 * | 3/2009 | Boyen | ................... | G06F 21/602 380/259 |
| 7,711,122 B2 * | 5/2010 | Allen | ..................... | H04L 9/0825 380/277 |
| 7,792,300 B1 * | 9/2010 | Caronni | ............. | G06Q 20/3829 380/259 |
| 8,316,237 B1 * | 11/2012 | Felsher | ................. | H04L 9/0825 380/282 |
| 8,353,015 B2 * | 1/2013 | Carpenter | ........... | G06F 21/6218 380/277 |
| 8,437,474 B2 * | 5/2013 | Zheng | ................... | H04L 9/0833 380/255 |
| 8,904,181 B1 * | 12/2014 | Felsher | ................. | H04L 9/0825 380/282 |
| 9,049,023 B2 * | 6/2015 | Green | .................... | H04L 9/3073 |
| 2003/0079120 A1 * | 4/2003 | Hearn | ..................... | G06F 21/10 713/150 |
| 2004/0086124 A1 * | 5/2004 | Sasaki | .................. | H04L 9/0833 380/277 |
| 2006/0282662 A1 * | 12/2006 | Whitcomb | .............. | G06F 21/33 713/156 |
| 2007/0033397 A1 * | 2/2007 | Phillips, II | ........... | H04L 63/045 713/168 |
| 2008/0059787 A1 * | 3/2008 | Hohenberger | ........ | H04L 9/3013 713/153 |
| 2008/0310623 A1 * | 12/2008 | Phillips, II | ........... | H04L 63/045 380/29 |
| 2011/0058673 A1 * | 3/2011 | Zheng | ................... | H04L 9/0833 380/255 |
| 2011/0246774 A1 * | 10/2011 | Phillips, II | ........... | H04L 63/045 713/168 |
| 2011/0289314 A1 * | 11/2011 | Whitcomb | .............. | G06F 21/33 713/155 |
| 2012/0331283 A1 * | 12/2012 | Chandran | ............... | H04L 9/088 713/150 |
| 2013/0159701 A1 * | 6/2013 | Phillips, II | ............ | H04L 63/045 713/155 |
| 2015/0082028 A1 * | 3/2015 | Phillips, II | ............ | H04L 63/045 713/161 |

OTHER PUBLICATIONS

Xiaoxin Wu, et al., "Poster: A Certificateless Proxy Re-Encryption Scheme for Cloud-based Data Sharing" Proceedings of the 18th ACM Conference on Computer and Communications Security, XP055145160, Oct. 2011, 3 Pages.

Giuseppe Ateniese, et al., "Improved Proxy Re-encryption Schemes with Applications to Secure Distributed Storage" ACM Transactions on Information and System Security, vol. 9, No. 1, XP001242926, Feb. 2006, pp. 1-30.

International Search Report issued on Dec. 4, 2012 for PCT/JP2012/078028 filed on Oct. 30, 2012 with English Translation.

International Written Opinion mailed on Dec. 4, 2012 for PCT/JP2012/078028 filed on Oct. 30, 2012.

Yoshida, Takuya et al., "Proxy Re-encryption Scheme for Secure Data Sharing in Cloud Services", Toshiba Review 2011, vol. 66, No. 11, Nov. 1, 2011, 8 pages.

Abe, Shingo et al., "A Proposal of a Secure Cloud Storage using a Proxy Re-Encryption Scheme", Proceedings of the 2012 Symposium on Cryptography and Information Security, Jan. 30, 2012, 9 pages.

"Hybrid Cryptosystem Scheme—Combination of Symmetric Key Cryptosystem and Public Key Cryptosystem—Information Security Introduction", Itpro, http://itpro.nikkeibp.co.jp/article/COLUMN/20060620/241303, 3 pages.

Road of Java:Servlet (10.filter), http:www.javaroad.jp/servletjsp/sj_servlet10.htm, Apr. 23, 2014, 3 pages.

Libert, B. et al., "Unidirectional Chosen-Ciphertext Secure Proxy Re-encryption", Proc. PKC 2008, LNCS 4939, Springer, 2008, 28 pages.

International Preliminary Report on Patentability issued May 22, 2014 in PCT/JP2012/078028 filed Oct. 30, 2012 (English translation only).

Written Opinion issued Dec. 4, 2012 in PCT/JP 2012/078028 filed Oct. 30, 2012 (English translation only).

Search Report and Written Opinion issued May 14, 2015 in Singaporean Patent Application No. 11201402113S.

Yi-Jun He, et al., "Non-Transferable Proxy Re-Encryption Scheme for Data Dissemination Control" Cryptology ePrint Archive—http://eprint.iacr.org/2010/192, Mar. 31, 2011, pp. 1-30.

Piotr K. Tysowski, et al., "Towards Secure Communication for Highly Scalable Mobile Applications in Cloud Computing Systems" University of Waterloo, Centre for Applied Cryptographic Research, Technical Reports 2011—http://cacr.uwaterloo.ca/techreports/2011/cacr2011-33.pdf, Nov. 3, 2011, pp. 1-32.

Ryotaro Hayashi, et al., "Unforgeability or Re-Encryption Keys against Collusion Attack in Proxy Re-Encryption" IWSEC'11 Proceedings of the 6th International Conference on Advances in Information and Computer Security, Nov. 8, 2011, pp. 210-229.

* cited by examiner

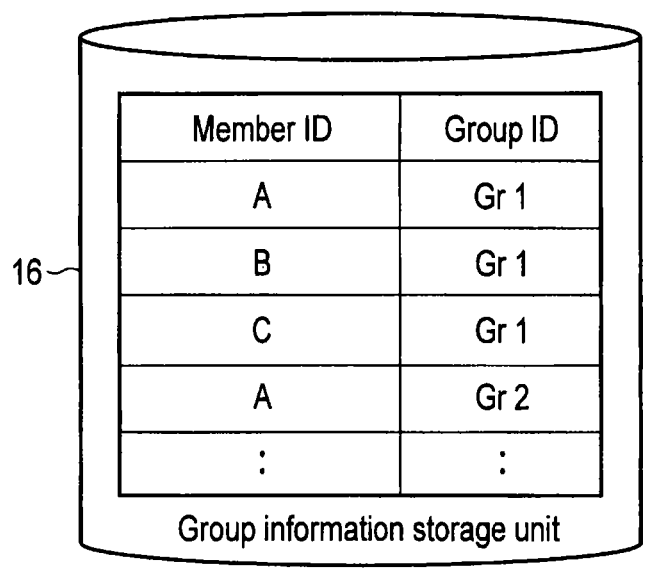
F I G. 2
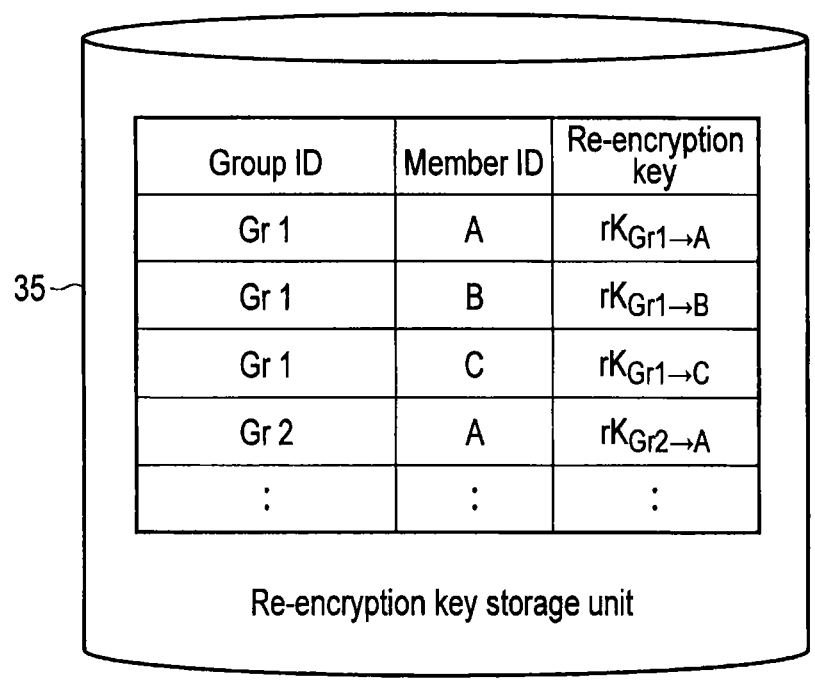
F I G. 3

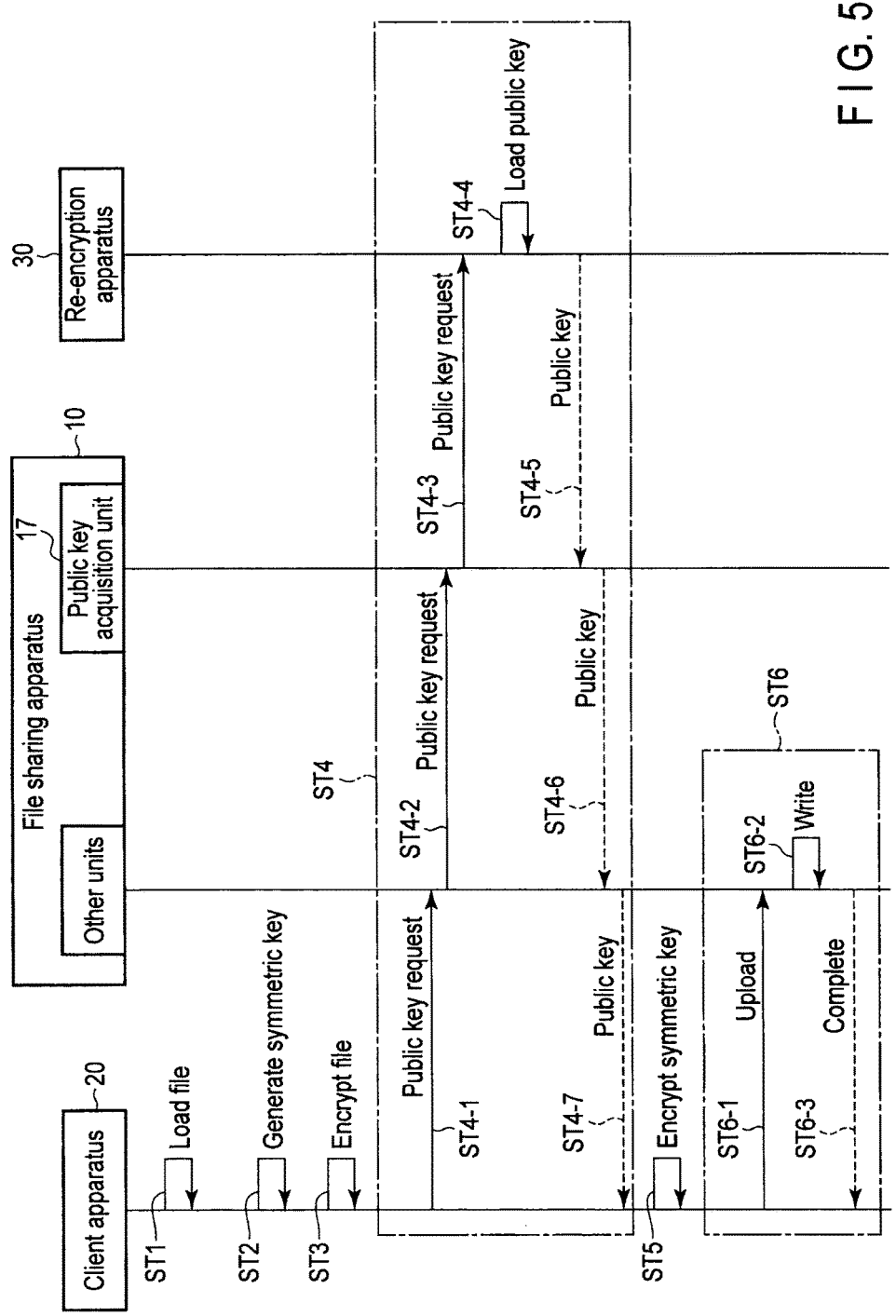
F I G. 5

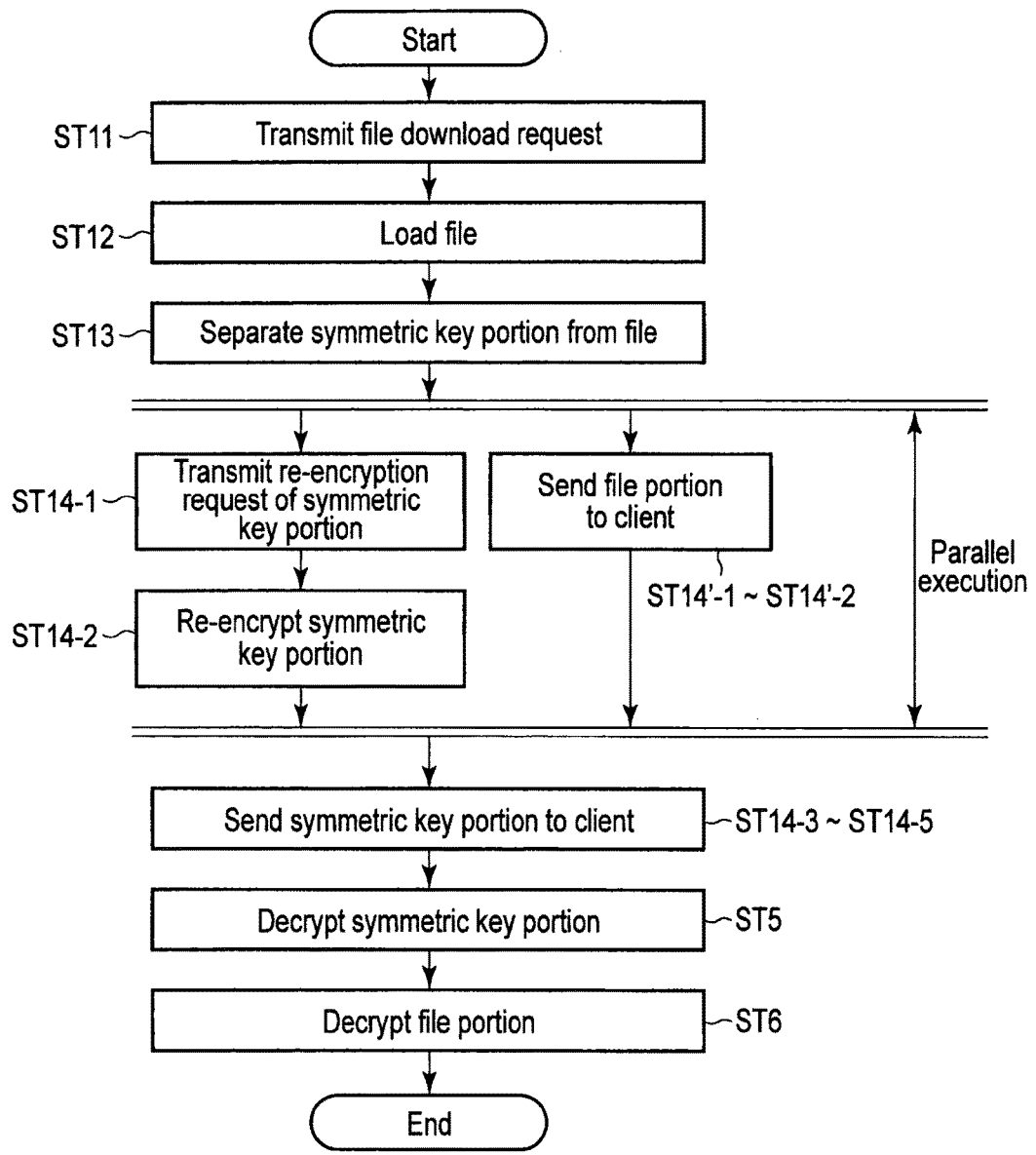
F I G. 6

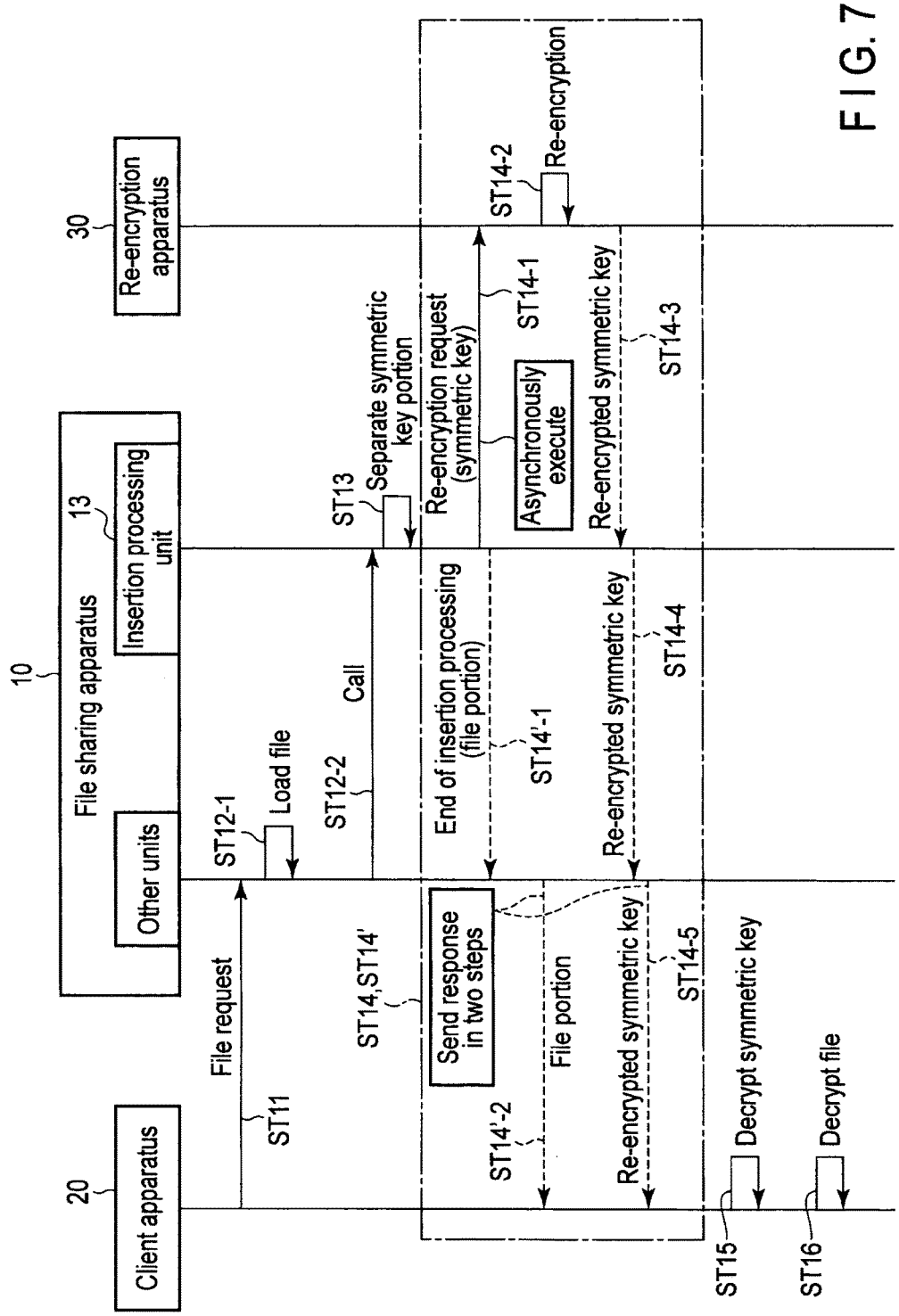
F I G. 7

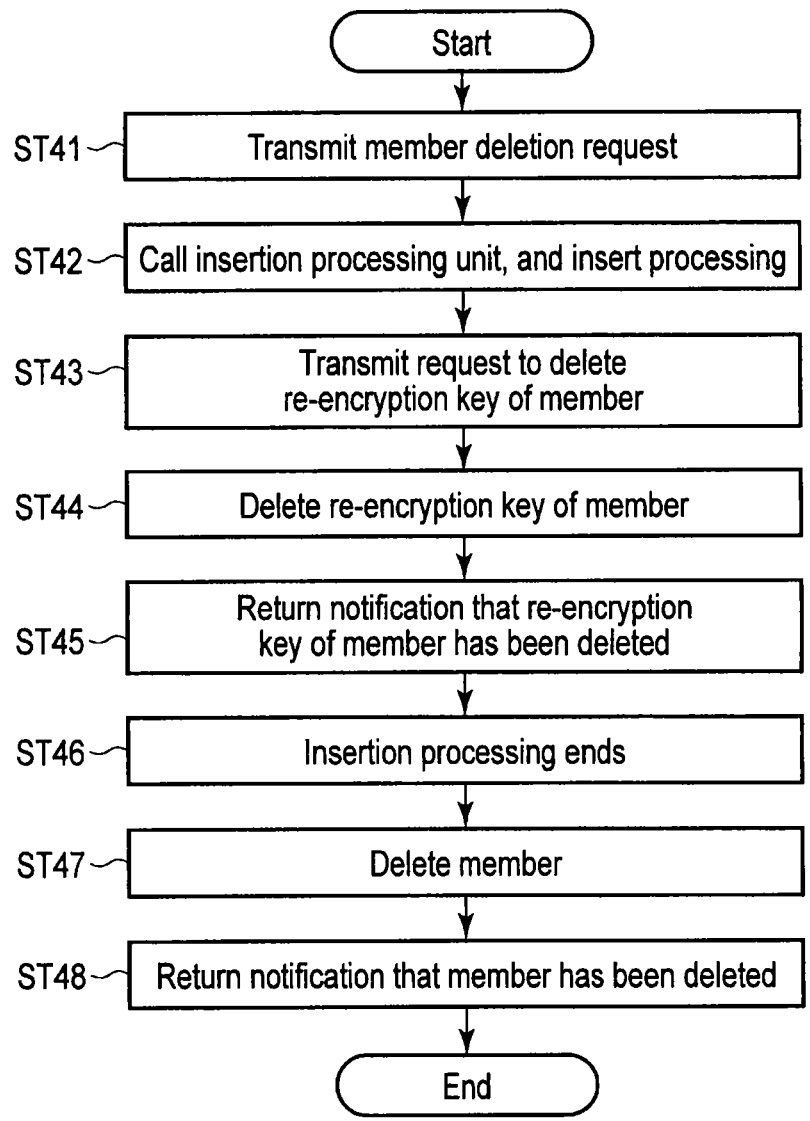
F I G. 10

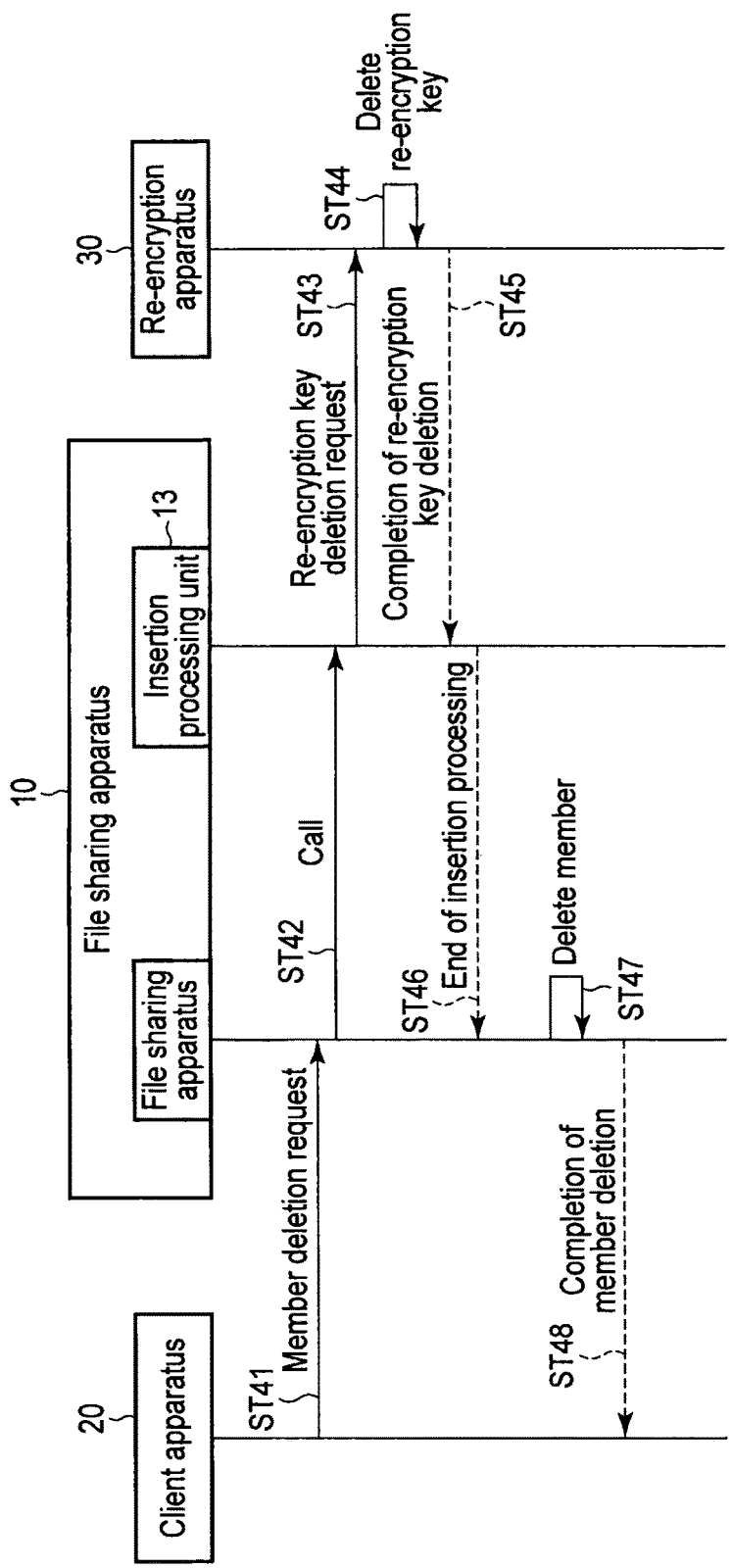
F I G. 11

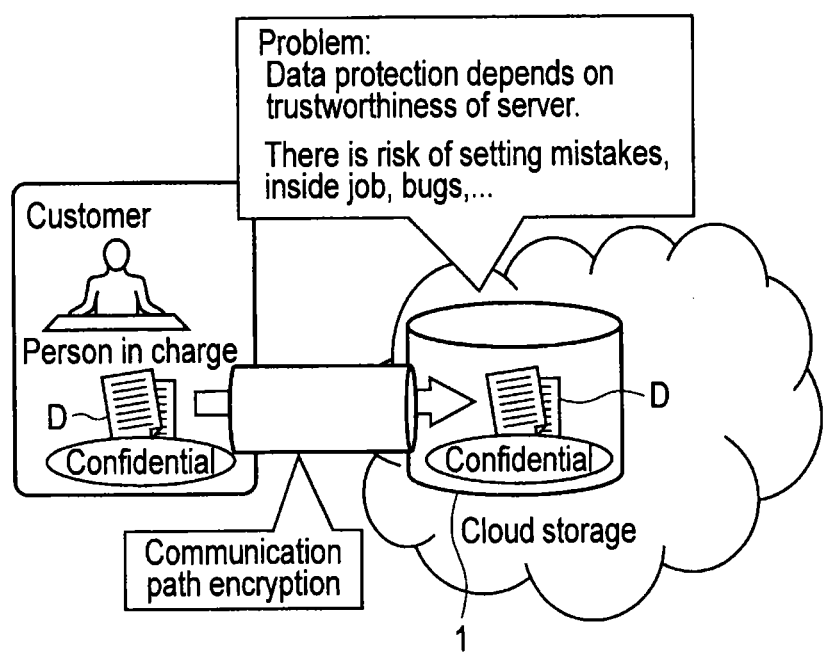
F I G. 12

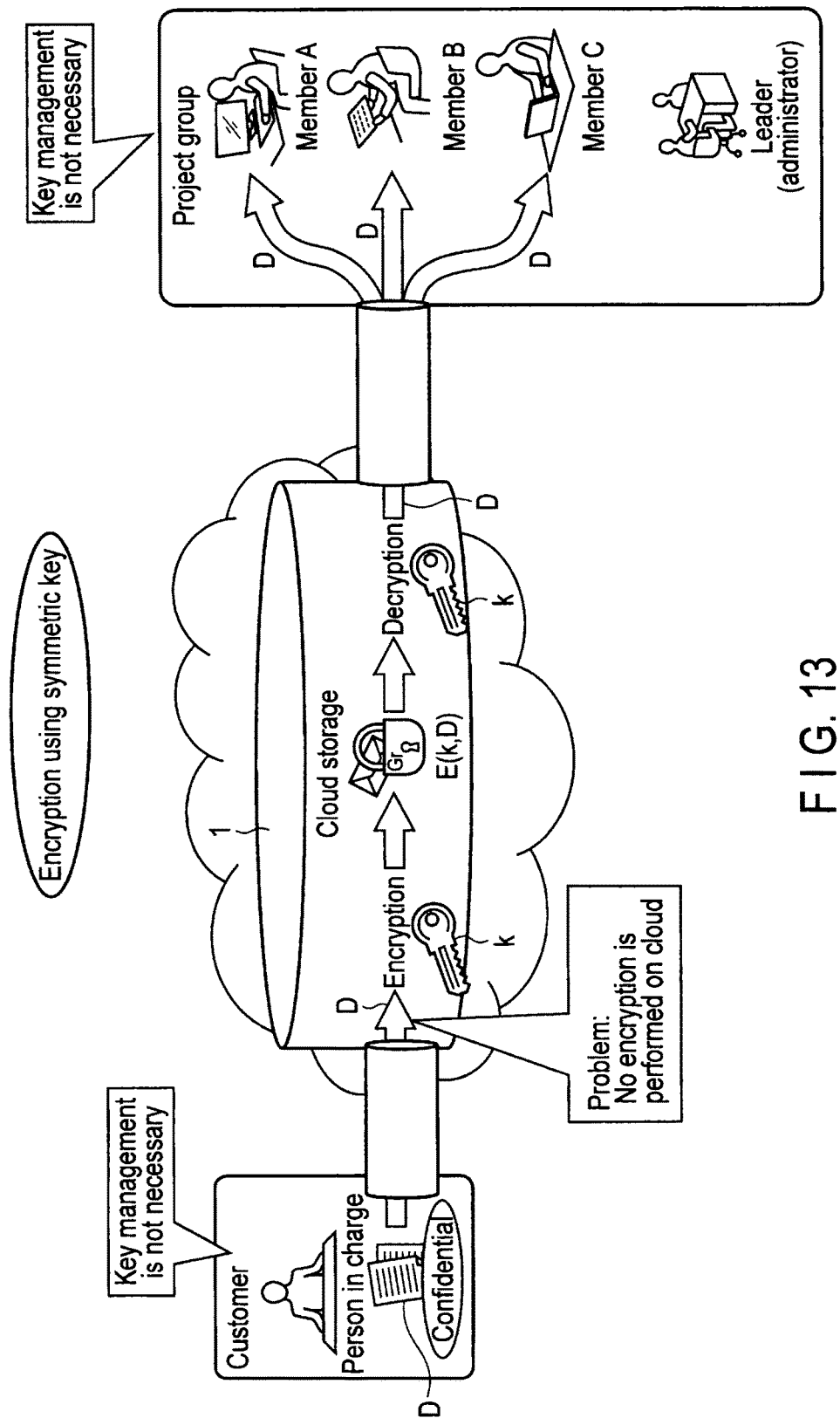
F I G. 13

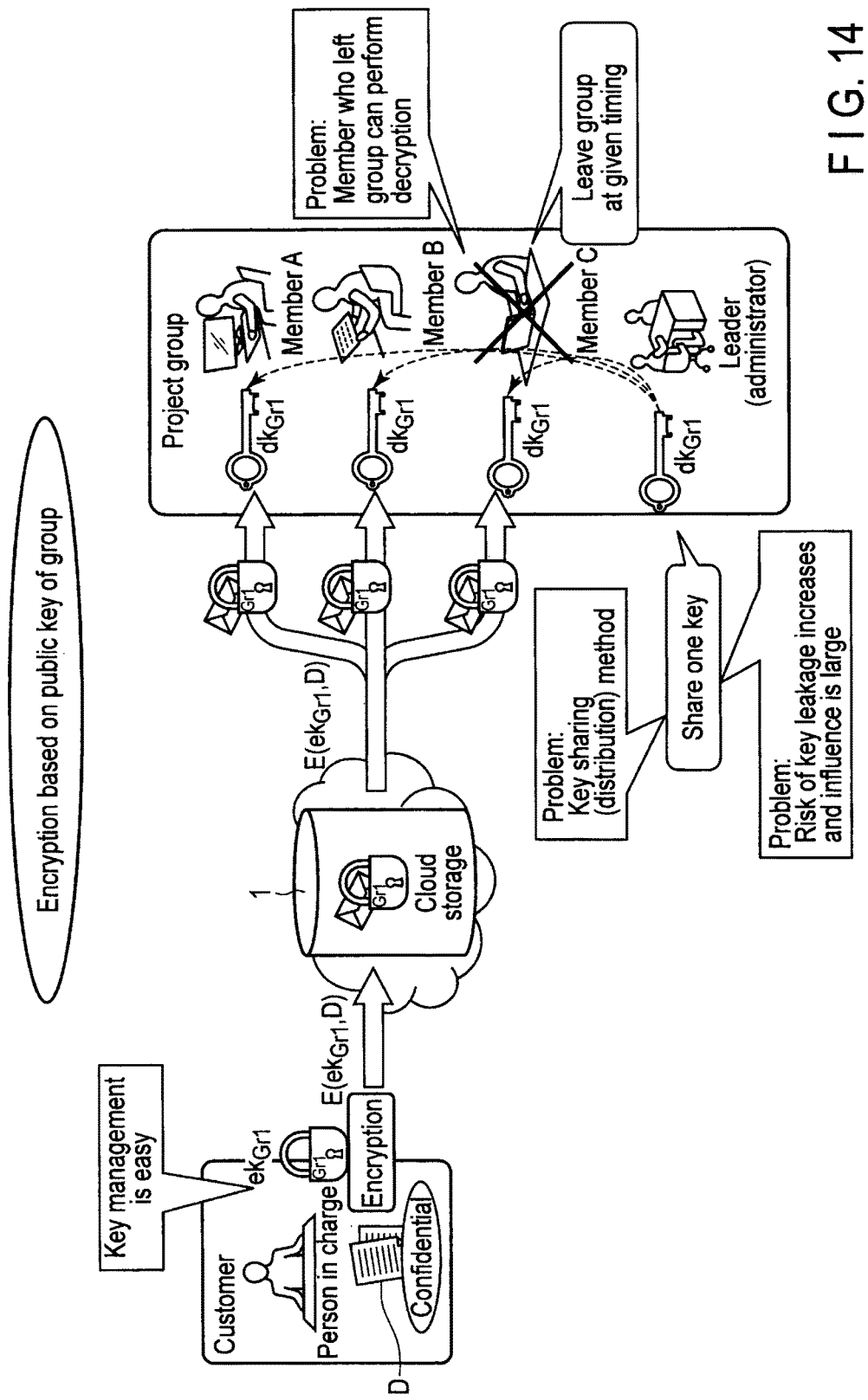
F I G. 14

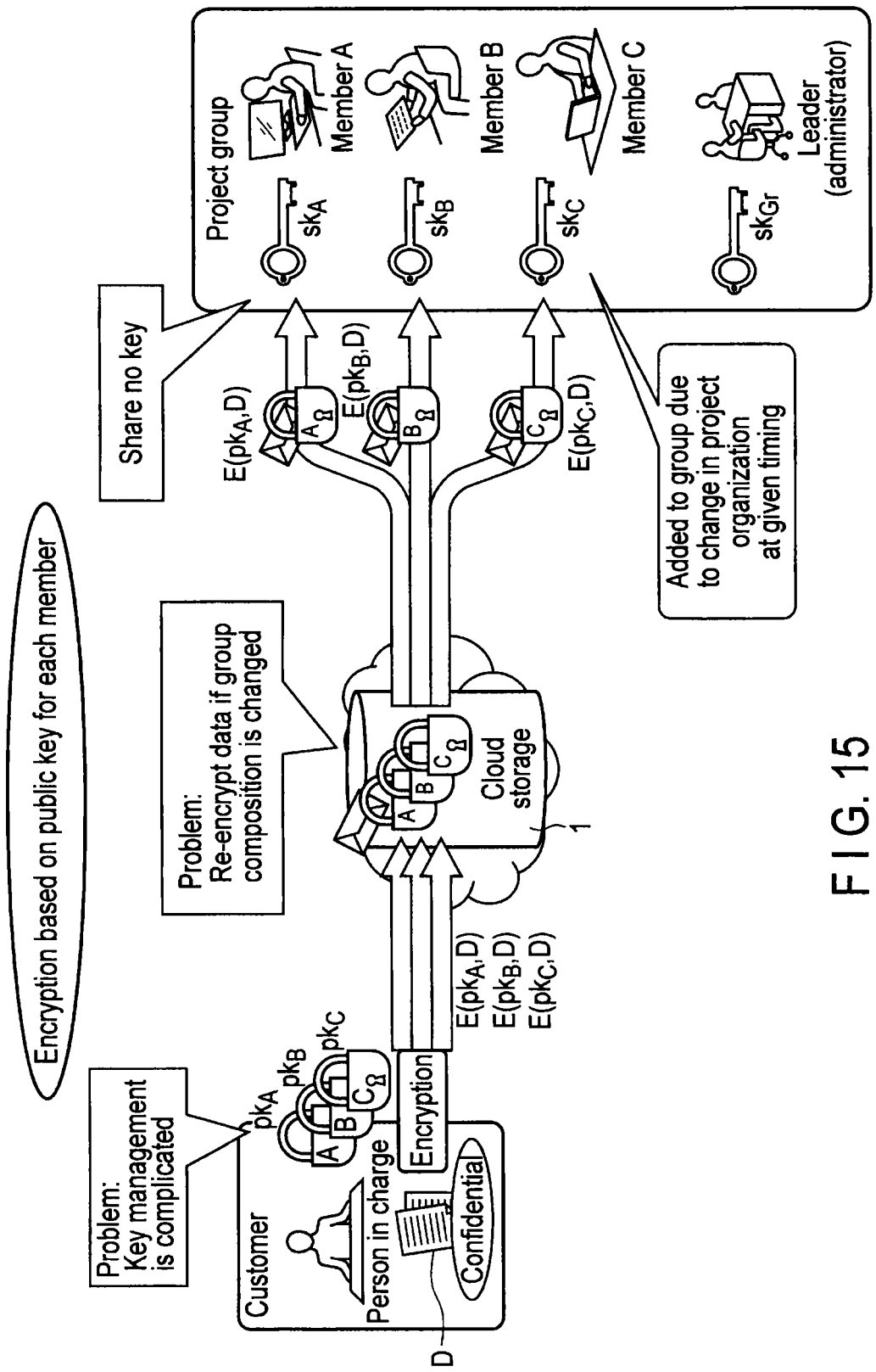
F I G. 15

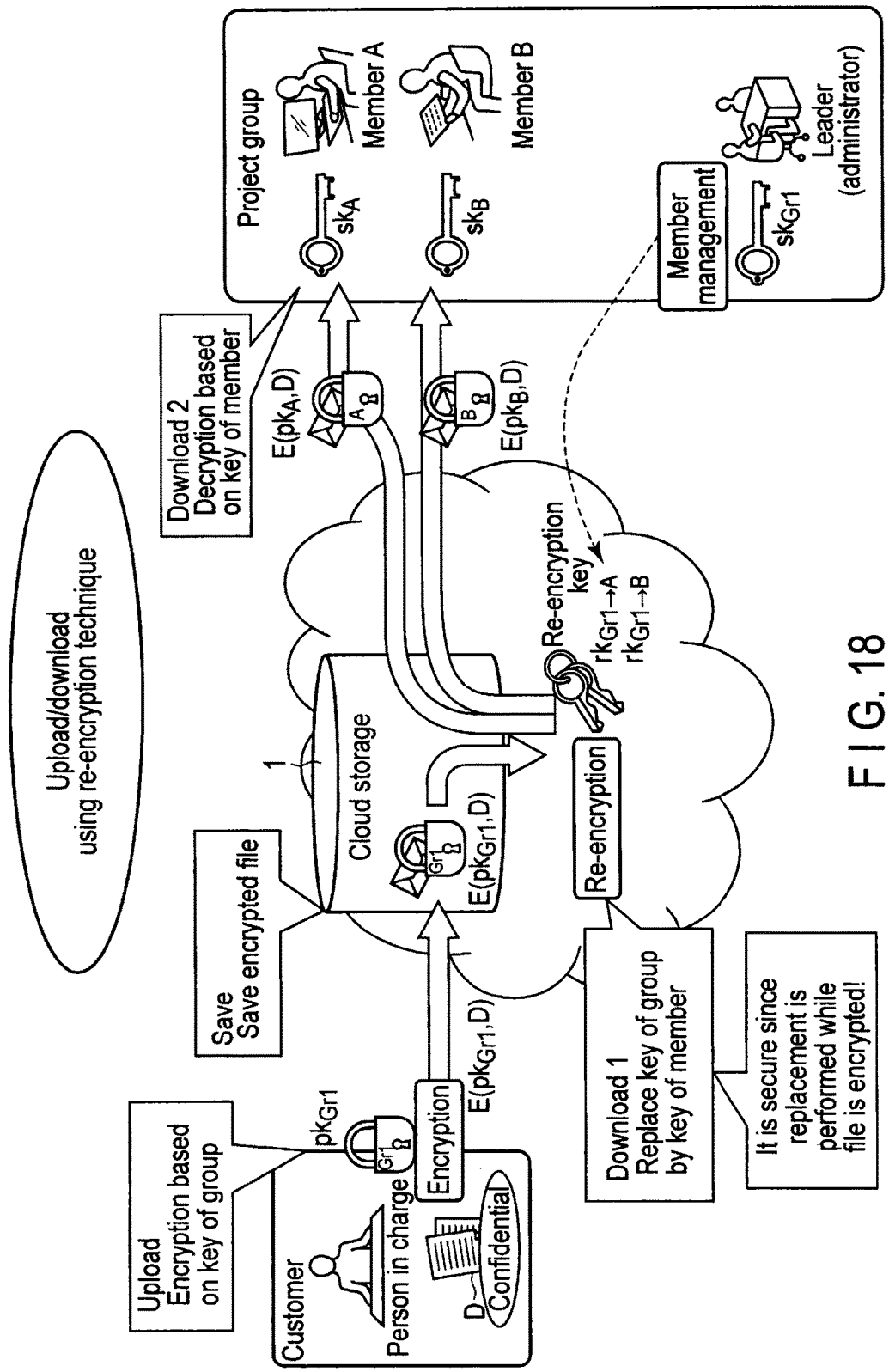
F I G. 18

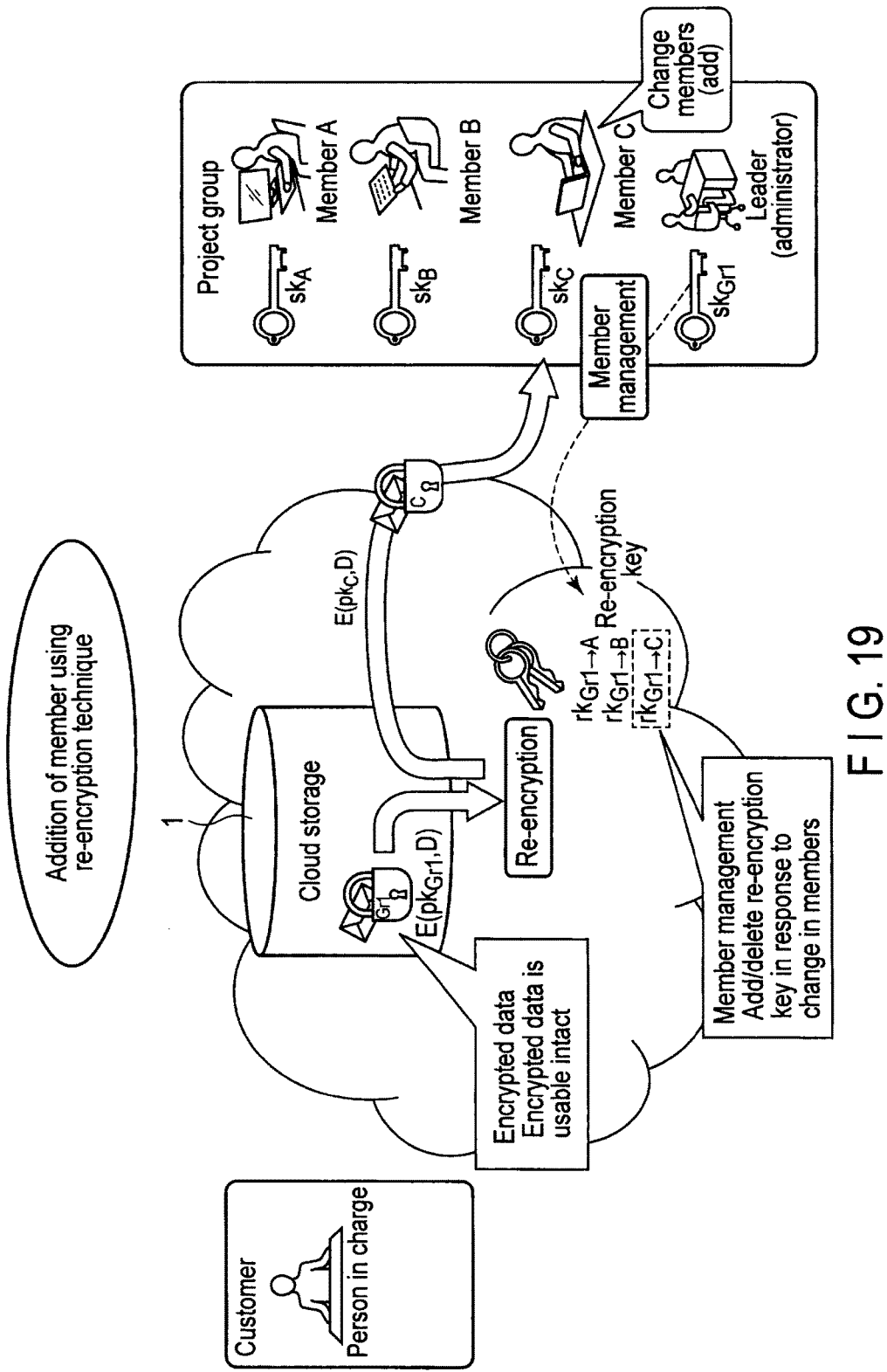
F I G. 19

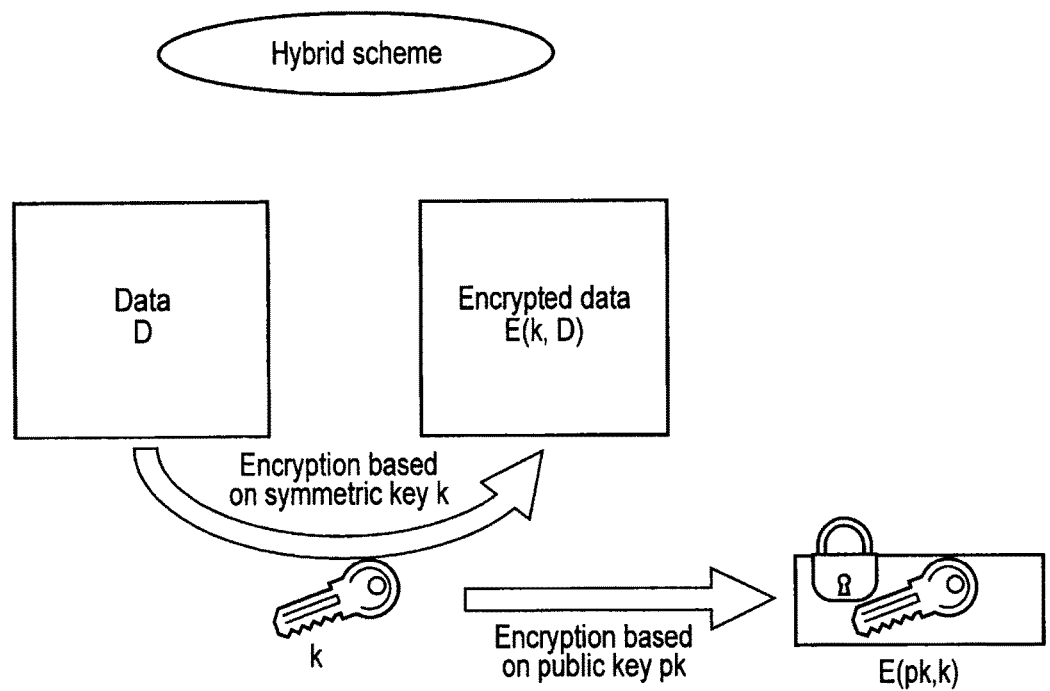
F I G. 20

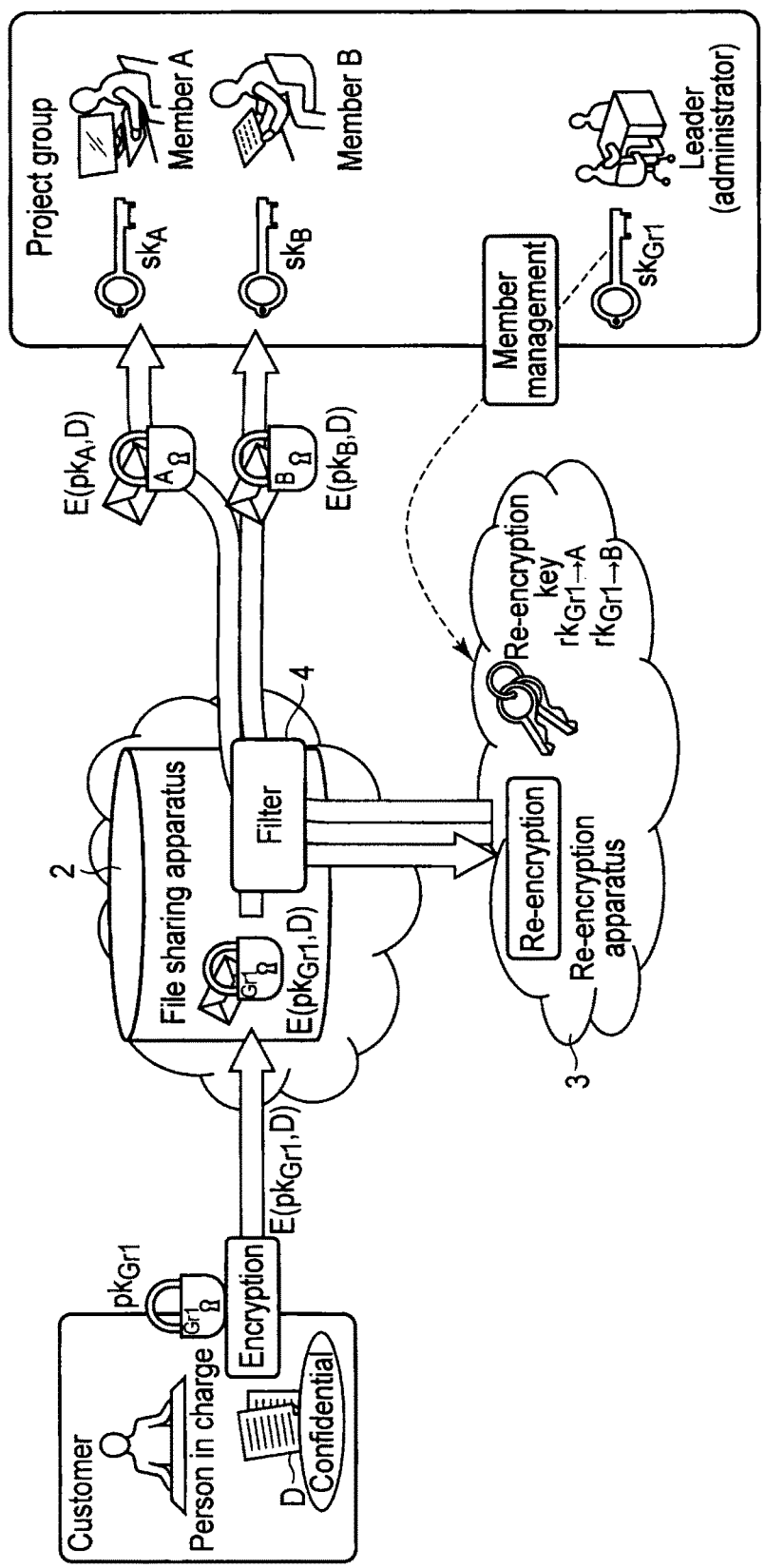
F I G. 21

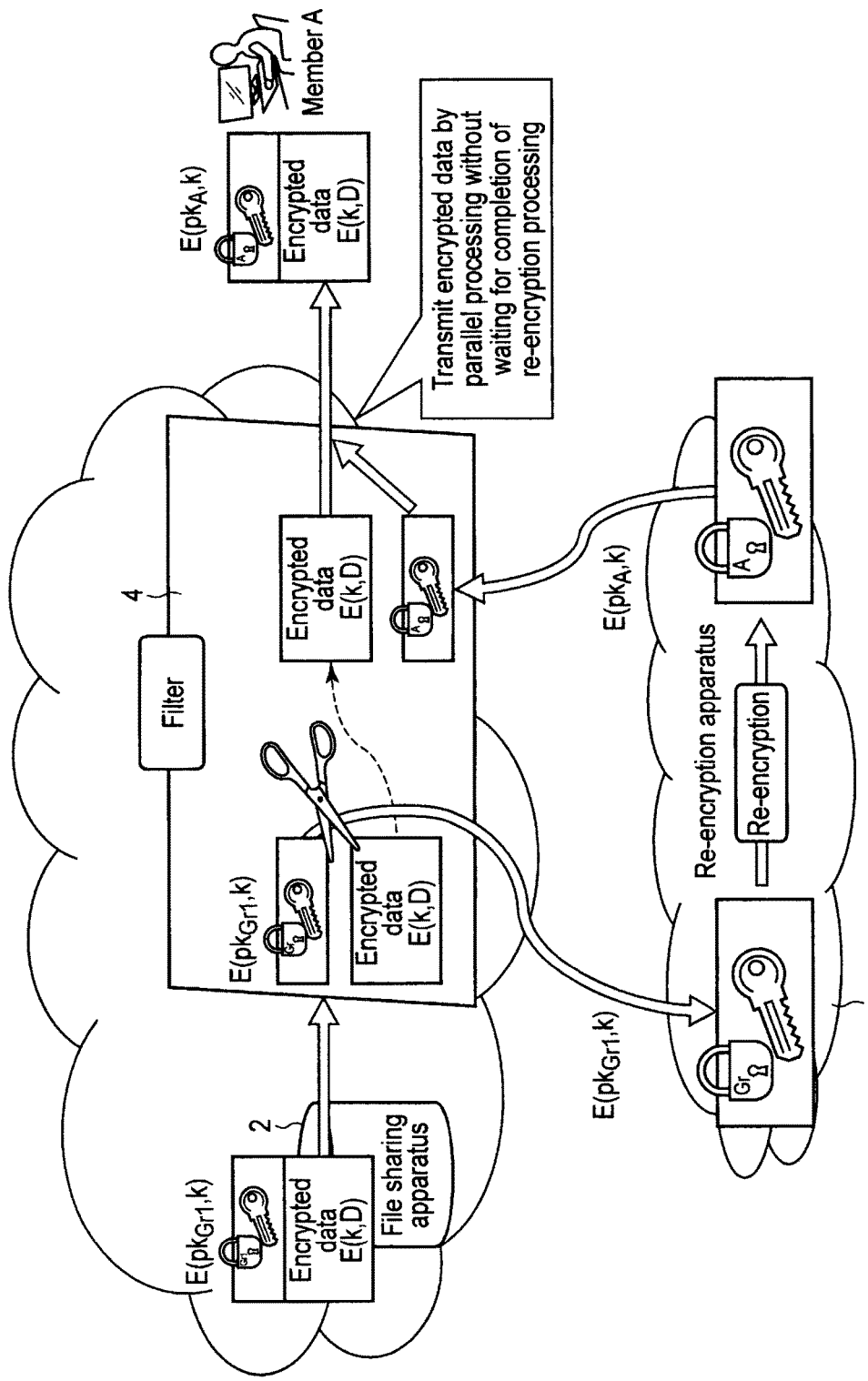
F I G. 23

RE-ENCRYPTION SYSTEM, RE-ENCRYPTION APPARATUS, AND PROGRAM

CROSS-REFERENCE TO RELATED APPLICATIONS

This is a Continuation Application of PCT application No. PCT/JP2012/078028, filed on Oct. 30, 2012, which was published under PCT Article 21(2) in Japanese.

This application is based upon and claims the benefit of priority from Japanese Patent Application No. 2011-245618, filed on Nov. 9, 2011; the entire contents of which are incorporated herein by reference.

FIELD

Embodiments described herein relate generally to a re-encryption system, a re-encryption apparatus, and a program.

BACKGROUND

In recent years, cloud computing (to be referred to as a cloud hereinafter) has rapidly become widespread since it can reduce the cost for information technology infrastructure (IT infrastructure) and operation management while ensuring the flexibility and extensibility of a service and improving the convenience. On the other hand, the security of the existing cloud is insufficient. Many companies cannot decide to introduce a public cloud due to concerns over security.

On the other hand, there is a growing need for groups comprising several members to be able to share data via cloud storage. This need is one of the major uses of the existing cloud. If, however, data is shared using an existing cloud, the following problems arise.

In an existing cloud service, to share data within a single group, one user uploads data to a cloud storage, and the members of the group download the data and use it.

However, in uploading, as shown in FIG. 12, data D on a communication path is protected by SSL/TLS but the data D in a cloud storage 1 is not encrypted. Therefore, the security of the data D in the cloud storage 1 depends on the trustworthiness of the cloud service. Since, for example, many companies and users use the cloud storage 1, there are concerns that other tenants may see data due to setting mistakes and that inappropriate authentication processing may be executed. In addition, data in the cloud storage 1 may be leaked by an insider, i.e., a server administrator.

To the contrary, in the existing cloud service, as shown in FIG. 13, a server may encrypt the data D based on a symmetric key k according to a symmetric key cryptosystem scheme, and save encrypted data E(k, D) in the cloud storage 1. In this case, the encrypted data E(k, D) in the cloud storage 1 is protected. However, a security problem still remains because the data D before encryption is not encrypted upon receiving (uploading) it, the decrypted data D is not encrypted upon distributing (downloading) it, and the server administrator can decrypt the encrypted data E(k, D).

Because of the above problems, many companies cannot decide to utilize the existing cloud.

As a method of solving these problems, data is encrypted before uploading it. This, however, degrades the convenience. For example, when data is encrypted using a conventional encryption technique and shared by a group, two methods can be used, (i) and (ii). Note that both the methods (i) and (ii) have merits and demerits, and there is a trade-off between the convenience and security. These methods (i) and (ii) will be described below.

(i) Method of Sharing Key of Group

As the merits of the method (i), data is always saved on the cloud while it is encrypted, and management of an encryption key is easy. As shown in FIG. 14, for example, when a group shares an encryption key $ek_{Gr1}$/decryption key $dk_{Gr1}$, and encrypts data based on public key cryptosystem, the encryption key $ek_{Gr1}$ and decryption key $dk_{Gr1}$ are paired. Both a member who uploads data and a member who downloads the data can readily manage the keys. Furthermore, since data can always be saved on the cloud while it is encrypted, concerns over security can be overcome.

As the demerits of the method (i), it is necessary to share the decryption key $dk_{Gr1}$ between the members, and a method of securely distributing/sharing the decryption key $dk_{Gr1}$ is required. Since, for example, the members share the decryption key $dk_{Gr1}$, the risk of leakage of the decryption key $dk_{Gr1}$ increases as the number of members increases. If the decryption key $dk_{Gr1}$ is leaked, it becomes necessary to update the decryption key $dk_{Gr1}$ shared by the group in order to prevent the leaked decryption key $dk_{Gr1}$ from being used, thereby degrading the convenience. In addition, if a member leaves the group, it becomes necessary to update the decryption key $dk_{Gr1}$ of other members in order to prevent the member that has left from decrypting data. A procedure performed when adding/deleting a member degrades the convenience.

As described above, the method (i) facilitates key management while imposing a problem about a key sharing method.

(ii) Encryption Method Using Keys of Members

As the merits of the method (ii), encrypted data is always saved on the cloud, and no key is shared between the members. For example, as shown in FIG. 15, when public key $pk_A$/private key $sk_A$, . . . are created for members A, . . . , the data D is encrypted based on public key cryptosystem, and encrypted data $E(pk_A, D)$, . . . is saved in the cloud storage 1, it is not necessary to distribute/share keys since the private keys $sk_A$, . . . are not shared with other members. Therefore, even if a given member I leaks a private key $sk_I$, other members need not update the private key $sk_I$.

As the demerits of the method (ii), a member who performs encryption needs to manage the public keys $pk_A$, . . . of the respective members, and adding a given member H to the group makes it necessary to re-encrypt the data D using a public key $pk_H$ of the added member H. For example, for a member who performs encryption, key management for the respective members becomes complicated, thereby degrading the convenience. If a member H is added, it is necessary for a member who performs encryption to encrypt the data D using the public key $pk_H$ of the added member H, and save the encrypted data in the cloud storage 1, thereby degrading the convenience.

As described above, in the conventional encryption techniques, there is a trade-off between the convenience and security.

As described above, when encrypted data is saved using the conventional encryption technique, there is a trade-off between the convenience and security.

A problem to be solved by the present invention is to provide a re-encryption system, re-encryption apparatus, and program, which allow the convenience and security to be compatible.

BRIEF DESCRIPTION OF THE DRAWINGS

FIG. 2 is a schematic view for explaining a group information storage unit according to the first embodiment;

FIG. 3 is a schematic view for explaining a re-encryption key storage unit according to the first embodiment;

FIG. 5 is a sequence chart for explaining the file upload processing according to the first embodiment;

FIG. 6 is a flowchart for explaining file download processing according to the first embodiment;

FIG. 7 is a sequence chart for explaining the file download processing according to the first embodiment;

FIG. 10 is a flowchart for explaining member deletion processing according to the first embodiment;

FIG. 11 is a sequence chart for explaining the member deletion processing according to the first embodiment;

FIG. 12 is a schematic view for explaining the problems of the conventional cloud storage;

FIG. 13 is a schematic view for explaining the problems when encryption is conventionally performed using a symmetric key;

FIG. 14 is a schematic view for explaining the problems when encryption is conventionally performed using the public key of a group;

FIG. 15 is a schematic view for explaining the problems when encryption is conventionally performed using the public key of each member;

FIG. 18 is a schematic view for explaining a re-encryption system according to an overview of each embodiment;

FIG. 19 is a schematic view for explaining member addition processing by the re-encryption system according to the overview of each embodiment;

FIG. 20 is a schematic view for explaining a general hybrid scheme;

FIG. 21 is a schematic view for explaining advantages when a filter function is applied to the re-encryption system according to the overview of each embodiment;

FIG. 23 is a schematic view for explaining the re-encryption system applied with the hybrid scheme.

DETAILED DESCRIPTION

In general, according to one embodiment, a re-encryption system comprises a file sharing apparatus and a re-encryption apparatus which are communicable with a client apparatus operated by a member belonging to a group.

The file sharing apparatus comprises a file storage device.

The file storage device stores a first encrypted file obtained by encrypting a file based on a public key of the group.

Upon receiving a file request including a member ID for identifying the member and a file name of the first encrypted file from the client apparatus, the file sharing apparatus acquires the first encrypted file from the file storage device based on the file name included in the file request.

The file sharing apparatus transmits a re-encryption request including the acquired first encrypted file and the member ID included in the file request to the re-encryption apparatus.

Upon receiving a second encrypted file obtained by encrypting the file based on the public key of the member ID from the re-encryption apparatus, the file sharing apparatus transmits the second encrypted file to the client apparatus.

The re-encryption apparatus comprises a re-encryption key storage device.

The re-encryption key storage device stores the member ID for identifying the member and a re-encryption key for re-encrypting, without decrypting, the first encrypted file to the second encrypted file in association with each other.

Upon receiving the re-encryption request from the file sharing apparatus, the re-encryption apparatus acquires the re-encryption key from the re-encryption key storage device based on the member ID included in the re-encryption request.

The re-encryption apparatus re-encrypts the first encrypted file included in the re-encryption request to the second encrypted file based on the acquired re-encryption key.

The re-encryption apparatus transmits the second encrypted file obtained by the re-encryption to the file sharing apparatus.

The client apparatus obtains the file by decrypting the second encrypted file from the file sharing apparatus based on a private key corresponding to the public key of the member.

Embodiments will be described below with reference to the accompanying drawings. Before that, a re-encryption technique, a hybrid scheme, and an overview of each embodiment, which are preconditions to each embodiment, will be explained.

As a method which allows the convenience and security to be compatible, a re-encryption technique (see B. Libert and D. Vergnaud, "Unidirectional Chosen-Ciphertext Secure Proxy Re-encryption," Proc. PKC 2008, LNCS 4939, pp. 360-379, Springer, 2008.) is well known.

Figure 16A:
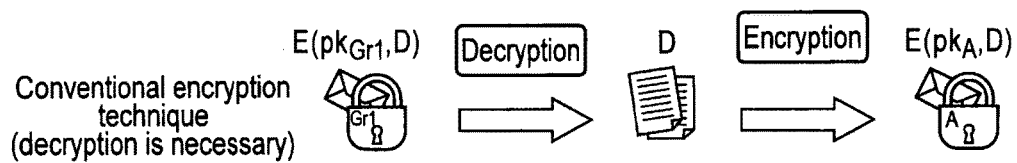
FIG. 16A is a schematic view showing a conventional encryption technique.
Figure 16B:
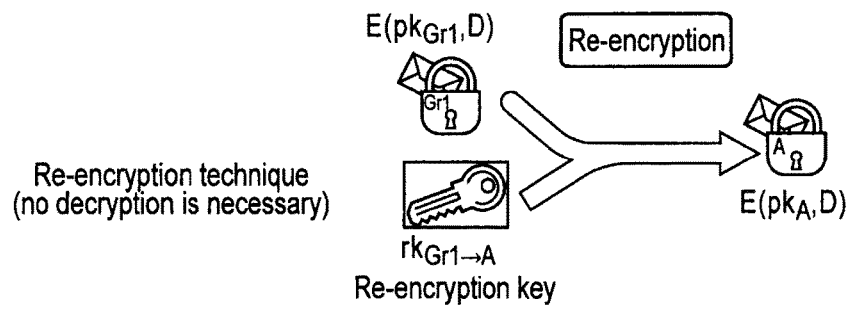
FIG. 16B is a schematic view showing a general re-encryption technique.

FIG. 16A shows the conventional encryption technique and FIG. 16B shows the re-encryption technique. In the re-encryption technique, as shown in FIG. 16B, it is possible to convert, without decrypting, data $E(pk_{Gr1}, D)$ encrypted using a public key $pk_{Gr1}$ of a given member into data $E(pk_A, D)$ encrypted using a public key $pk_A$ of another member A. That is, re-encryption is a technique capable of replacing a key without decrypting encrypted data.

Figure 17:
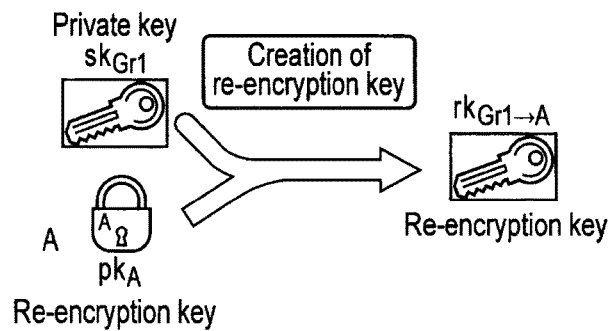
FIG. 17 is a schematic view for explaining a general process of creating a re-encryption key.

To perform such re-encryption processing, a re-encryption key $rk_{Gr1 \to A}$ is necessary. The re-encryption key $rk_{Gr1 \to A}$ is created from a private key $sk_{Gr1}$ before replacement and the public key $pk_A$ after replacement, as shown in FIG. 17. There is no problem even if the re-encryption key $rk_{Gr1 \to A}$ is published.

If the re-encryption technique is used, a file as data D is uploaded/downloaded to/from a cloud storage 1 while it is encrypted, as shown in FIG. 18.

At this time, a member who uploads the data encrypts the data D using the public key $pk_{Gr1}$ of the group, and saves the encrypted data $E(pk_{Gr1}, D)$ in the cloud storage 1. This eliminates the need for management of the keys of the respective members of the group.

When the member A of the group downloads the data D, he/she re-encrypts the encrypted data $E(pk_{Gr1}, D)$ using the re-encryption key $rk_{Gr1 \to A}$ for the member A on the server, and downloads the thus obtained re-encrypted data $E(pk_A, D)$.

As the merits of such re-encryption system, data can always be saved on the cloud while it is encrypted, encryption key management is easy, and no key is shared between members. For example, since re-encryption processing can be executed while the data D is encrypted, the data D is not decrypted on the cloud storage 1. Furthermore, each member need not share the private key $sk_A$, . . . with other members.

Note that in management of the members of the group using the re-encryption technique, as shown in FIG. 19, re-encryption keys $rk_{Gr1 \to A}$, . . . are added/deleted on the cloud storage 1. To add a member, a group administrator acquires a public key $pk_C$ of a member C to be added. The group administrator creates a re-encryption key $rk_{Gr1 \to C}$ from the private key $sk_{Gr1}$ of the group and the acquired public key $pk_C$, and stores the created re-encryption key $rk_{Gr1 \to C}$ in the cloud storage 1. Unlike the conventional technique, even if such member change is made, it is not necessary to re-encrypt the encrypted data $E(pk_{Gr1}, D)$ on the cloud storage 1, thereby preventing the convenience from decreasing.

On the other hand, there is no demerit of the re-encryption system, especially.

Note that when encrypting data based on public key cryptosystem, an attempt to increase the speed is generally made using a scheme (to be referred to as a hybrid scheme hereinafter) called hybrid encryption combined with the symmetric key cryptosystem technique in which the speed of encryption/decryption processing is high (see Hybrid Cryptosystem Scheme—Combination of Symmetric Key Cryptosystem and Public Key Cryptosystem—Information Security Introduction: ITpro, http://itpro.nikkeibp.co.jp/article/COLUMN/20060620/241303 (hereinafter, referred to as non-patent literature 1)). In the hybrid scheme, as shown in FIG. 20, encrypted data $E(k, D)$ is created by encrypting the data D to be protected using a symmetric key k according to the symmetric key cryptosystem scheme at high speed, and an encrypted key $E(pk, k)$ is created by encrypting the symmetric key k based on a public key pk according to the public key cryptosystem scheme.

Using the hybrid scheme can make the best use of the merit of the public key cryptosystem scheme in which key distribution/management is easy and that of the symmetric key cryptosystem scheme in which the speed of processing is high.

Note that it is possible to securely share data between the members on the cloud storage as long as an arrangement using the re-encryption technique is adopted, regardless of whether to use the hybrid scheme.

Examples of a case in which a re-encryption system using the re-encryption technique is constructed include a case in which a new system is constructed, and a case in which a system is constructed by adding a re-encryption function to an existing file sharing system.

In the latter case, that is, when a system is constructed by incorporating a re-encryption function in an existing file sharing system, much labor is required and the cost is high.

As a method of newly cooperating with another function without modifying the processing of the existing file sharing system so much, a Java filter (see Road of Java: Servlet (10.filter), http://www.javaroad.jp/servletjsp/sj_servlet10.htm) may be used. Using a filter function makes it possible to add processing to request/response processing between a file sharing apparatus (an apparatus corresponding to the cloud storage 1) and its client. By performing re-encryption processing in the filter processing, it is possible to add the re-encryption function with a small modification without modifying the existing file sharing system so much or incorporating the re-encryption function.

That is, as shown in FIG. 21, only processing (for example, a filter 4) cooperating with a re-encryption apparatus 3 is added to a file sharing apparatus 2 as a component.

Note that the above-described re-encryption system may be implemented intact. From the study of the present inventor, however, a mode in which data distribution processing is improved is more preferable. In the first embodiment, a mode in which data distribution processing is improved will be described.

In addition, in the re-encryption system, when simply cooperating with the re-encryption apparatus 3, it is necessary to re-encrypt the encrypted data $E(pk_{Gr1}, D)$ saved in the file sharing apparatus 2 and, therefore, it is necessary to always wait for re-encryption processing for distribution to the members. The re-encryption processing is more complicated than the existing public key cryptosystem scheme, thereby requiring a longer processing time.

Figure 22:
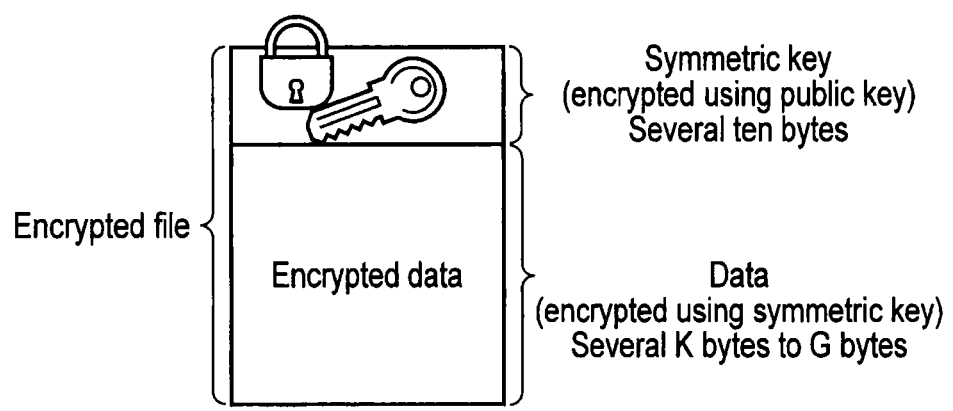
FIG. 22 is a schematic view showing the format of a file in the hybrid scheme.

As shown in FIG. 22, attention is paid to the file format of the hybrid scheme. In this format, a portion of an encrypted file in the file sharing apparatus 2, which is to undergo the re-encryption processing, is a symmetric key portion (encrypted using the public key). Instead of the encrypted data $E(pk_{Gr1}, D)$ shown in FIG. 21, an encrypted file formed from a portion of an encrypted symmetric key $E(pk_{Gr1}, k)$ including the symmetric key k (encrypted by the public key $pk_{Gr1}$), and a portion of the encrypted data $E(k, D)$ including the data D encrypted by the symmetric key k is saved in the file sharing apparatus 2, and only the portion of the encrypted symmetric key $E(pk_{Gr1}, k)$ is sent to the re-encryption apparatus 3, as shown in FIG. 23. The portion of the encrypted data $E(k, D)$ depends on the size of the data. Considering that the size is significantly larger than that of the portion of the encrypted symmetric key $E(pk_{Gr1}, k)$, however, it is possible to reduce communication processing between the file sharing apparatus 2 and the re-encryption apparatus 3.

Figure 24:
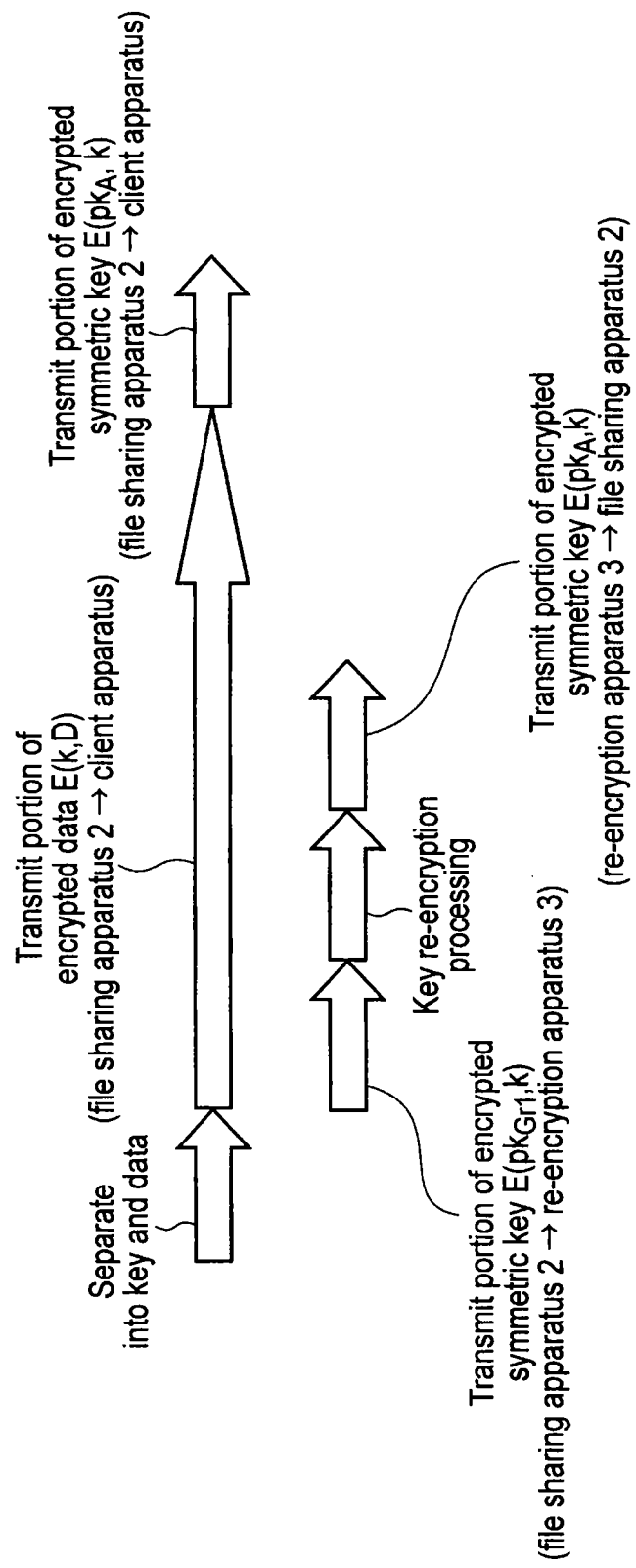
FIG. 24 is a schematic view for explaining the processing time of the re-encryption system applied with the hybrid scheme.

As shown in FIG. 24, simultaneously with processing of transmitting the portion of the encrypted symmetric key $E(pk_{Gr1}, k)$ to the re-encryption apparatus 3, the portion of the encrypted data $E(k, D)$ is transmitted to a member (client). Although the processing time depends on the size of the portion of the encrypted data $E(k, D)$ and the speed of a network, the processing time of download processing is generally longer than that of the re-encryption processing. Therefore, while the download processing is executed, the re-encryption processing ends. Consequently, it can be expected that the server processing time of the re-encryption processing ends while the portion of the encrypted data $E(k, D)$ is transmitted to the client apparatus.

As described above, as shown in FIGS. 22, 23, and 24, the mode in which the data distribution processing is improved is preferable since attention is paid to the data format of the hybrid scheme to parallelly perform the re-encryption processing for the portion of the encrypted symmetric key $E(pk_{Gr1}, k)$ and processing of transmitting the portion of the encrypted data $E(k, D)$, and thus the time of the whole download processing can be shortened, as compared with the mode shown in FIG. 21.

The mode in which the data distribution processing is improved has been supplementarily explained. Each embodiment will be described in detail. Note that the first embodiment shows an application mode in which data distribution processing is improved, and the second embodiment shows a basic mode in which data distribution processing is not improved.

First Embodiment

Figure 1:
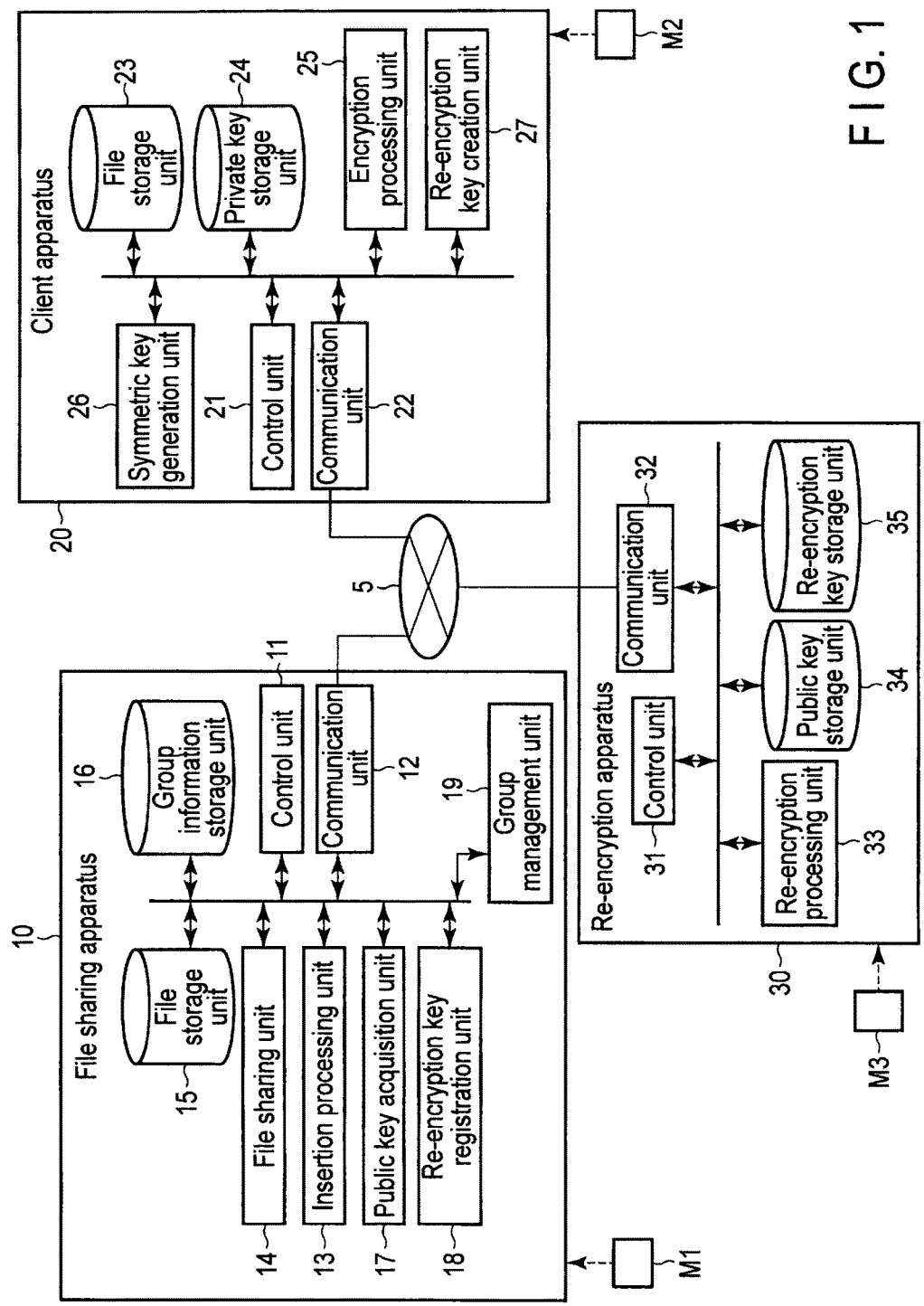
FIG. 1 is a schematic block diagram showing the arrangement of a re-encryption system according to the first embodiment.

FIG. 1 is a schematic view showing the arrangement of a re-encryption system according to the first embodiment. The re-encryption system has a client/server arrangement, and includes a file sharing apparatus 10 and a re-encryption apparatus 30, which are communicable with a client apparatus 20 operated by a member belonging to a group. Note that the file sharing apparatus 10 and re-encryption apparatus 30 are server apparatuses, and the apparatuses 10, 20, and 30 are communicable with each other via an Internet 5. Each of the apparatuses 10, 20, and 30 can be implemented by a hardware arrangement or a combined arrangement of hardware resources and software. As the software of the combined arrangement, as shown in FIG. 1, a program is used for causing each computer to implement the function of each apparatus when it is installed, in advance, on each computer from a network or non-transitory computer-readable storage media M1 to M3, and executed by the processor of each computer. These points also apply to modifications to be described later.

In this embodiment, the file sharing apparatus 10 includes a control unit 11, a communication unit 12, an insertion processing unit 13, a file sharing unit 14, a file storage unit 15, a group information storage unit 16, a public key acquisition unit 17, a re-encryption key registration unit 18, and a group management unit 19.

The control unit 11, communication unit 12, insertion processing unit 13, file sharing unit 14, public key acquisition unit 17, re-encryption key registration unit 18, and group management unit 19 are functional blocks which are implemented when, for example, a CPU (not shown) executes a program including steps within the file sharing apparatus 10 (to be described later). The communication unit 12 serves as a communication interface with other apparatuses 20 and 30. In the following description, an explanation that data is transmitted/received to/from other apparatuses 20 and 30 via the communication unit 12 will be omitted for the sake of descriptive convenience.

The insertion processing unit 13, public key acquisition unit 17, and re-encryption key registration unit 18, which cooperate with the re-encryption apparatus 30, may be implemented using the Java filter function, in terms of constructing a re-encryption system without modifying the existing file sharing system so much.

The file storage unit 15 can be implemented as a storage device readable/writable from the CPU (not shown), and stores an encrypted file including a first encrypted symmetric key portion obtained by encrypting a symmetric key based on the public key of the group and an encrypted data portion obtained by encrypting data based on the symmetric key. Note that the "first encrypted symmetric key portion" may be interpreted as a "first encrypted symmetric key" or "encrypted symmetric key". Furthermore, the "encrypted data portion" may be interpreted as "encrypted data".

The group information storage unit 16 can be implemented as a storage device readable/writable from the CPU (not shown), and stores a group ID for identifying a group and a member ID for identifying a member belonging to the group in association with each other, as shown in FIG. 2.

On the other hand, the client apparatus 20 includes a control unit 21, a communication unit 22, a file storage unit 23, a private key storage unit 24, an encryption processing unit 25, a symmetric key generation unit 26, and a re-encryption key creation unit 27.

The control unit 21, communication unit 22, encryption processing unit 25, symmetric key generation unit 26, and re-encryption key creation unit 27 are functional blocks which are implemented when, for example, a CPU (not shown) executes a program including steps within the client apparatus 20 (to be described later). The communication unit 22 serves as a communication interface with other apparatuses 10 and 30. In the following description, an explanation that data is transmitted/received to/from other apparatuses 10 and 30 via the communication unit 22 will be omitted for the sake of descriptive convenience.

The file storage unit 23 can be implemented as a storage device readable/writable from the CPU (not shown), and stores, for example, a file to be uploaded.

The private key storage unit 24 can be implemented as a storage device readable/writable from the CPU (not shown), and stores, for example, a private key corresponding to the public key of each member. If a member is a group administrator, the private key storage unit 24 also stores a private key corresponding to the public key of the group.

On the other hand, the re-encryption apparatus 30 includes a control unit 31, a communication unit 32, a re-encryption processing unit 33, a public key storage unit 34, and a re-encryption key storage unit 35.

The control unit 31, communication unit 32, and re-encryption processing unit 33 are functional blocks which are implemented when, for example, a CPU (not shown) executes a program including steps within the re-encryption apparatus 30 (to be described later). The communication unit 32 serves as a communication interface with other apparatuses 10 and 20. In the following description, an explanation that data are transmitted/received to/from other apparatuses 10 and 20 via the communication unit 32 will be been omitted for the sake of descriptive convenience.

The public key storage unit 34 can be implemented as a storage device readable/writable from the CPU (not shown), and stores a group ID for identifying a group, the public key of the group, a member ID for identifying a member, and the public key of the member in association with each other.

The re-encryption key storage unit 35 can be implemented as a storage device readable/writable from the CPU (not shown), and stores a member ID for identifying a member and a re-encryption key for re-encrypting, without decrypting, the first encrypted symmetric key portion to a second encrypted symmetric key portion in association with each other, as shown in FIG. 3. Note that the "second encrypted symmetric key portion" may be interpreted as a "second encrypted symmetric key" or "re-encrypted symmetric key".

The operation of the re-encryption system having the above-described arrangement will be described with reference to FIGS. 4, 5, 6, 7, 8, 9, 10, and 11. Note that file upload processing (FIGS. 4 and 5), file download processing (FIGS. 6 and 7), member addition processing (FIGS. 8 and 9), and member deletion processing (FIGS. 10 and 11) are sequentially explained below in the order named.

Figure 4:
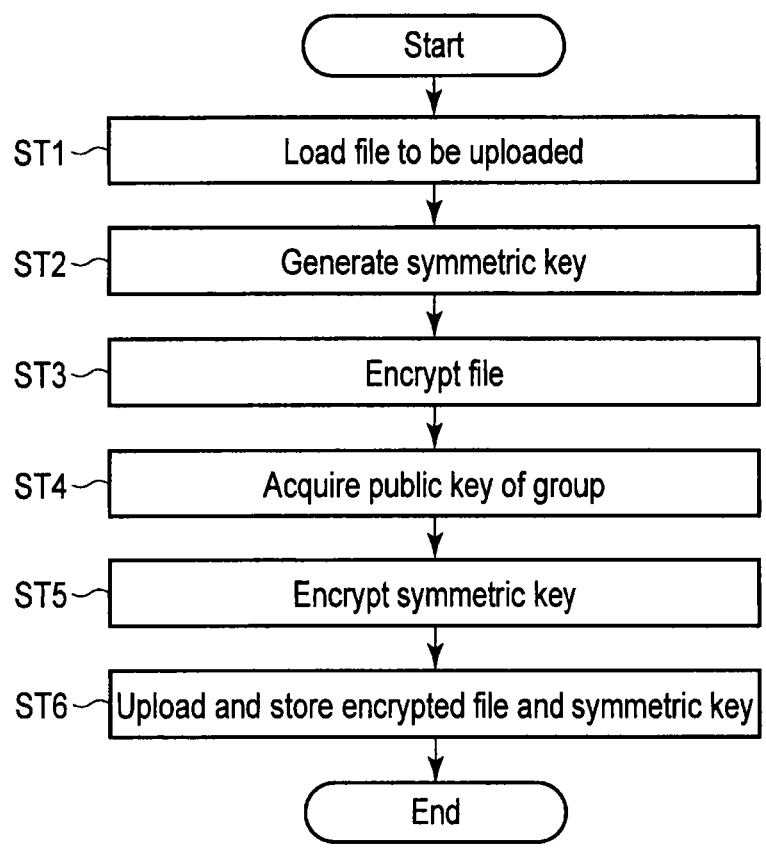
FIG. 4 is a flowchart for explaining file upload processing according to the first embodiment.

FIGS. 4 and 5 show the procedure of the file upload processing.

In the client apparatus 20, the control unit 21 loads, from the file storage unit 23, a file to be uploaded (step ST1).

In the client apparatus 20, the control unit 21 causes the symmetric key generation unit 26 to generate a symmetric key k. The control unit 21 transfers the symmetric key k and the file loaded in step ST1 to the encryption processing unit 25 (step ST2).

In the client apparatus 20, the encryption processing unit 25 encrypts the data D of the file using the symmetric key k, and transfers the thus obtained encrypted data portion (E(k, D)) to the control unit 21 (step ST3).

In step ST4, steps ST4-1 to ST4-7 to be described below are executed.

In the client apparatus 20, the control unit 21 requests, of the file sharing apparatus 10, the public key $pk_{Gr1}$ of the group to which the file to be uploaded will be published (step ST4-1). More specifically, the control unit 21 transmits a public key request including a group ID for identifying the group to the file sharing apparatus 10.

In the file sharing apparatus 10, the control unit 11 sends the public key request to the public key acquisition unit 17 (step ST4-2).

In the file sharing apparatus 10, the public key acquisition unit 17 transmits the public key request to the re-encryption apparatus 30 (step ST4-3).

In the re-encryption apparatus 30, the control unit 31 extracts the public key $pk_{Gr1}$ of the group from the public key storage unit 34 based on the group ID included in the public key request (step ST4-4).

In the re-encryption apparatus 30, the control unit 31 transmits the public key $pk_{Gr1}$ of the group to the file sharing apparatus 10 (step ST4-5).

In the file sharing apparatus 10, the public key acquisition unit 17 transfers the public key $pk_{Gr1}$ of the group to the control unit 11 (step ST4-6).

In the file sharing apparatus 10, the control unit 11 transmits the public key $pk_{Gr1}$ of the group to the client apparatus 20 (step ST4-7).

In the client apparatus 20, the control unit 21 transfers the received public key $pk_{Gr1}$ of the group and the symmetric key k generated in step ST2 to the encryption processing unit 25. The encryption processing unit 25 encrypts the symmetric key k using the public key $pk_{Gr1}$ of the group, and transfers the thus obtained first encrypted symmetric key portion ($E(pk_{Gr1}, k)$) to the control unit 21 (step ST5).

In step ST6, steps ST6-1 to ST6-3 to be described below are executed.

In the client apparatus 20, the control unit 21 integrates the encrypted data portion (E(k, D)) transferred in step ST2 and the first encrypted symmetric key portion ($E(pk_{Gr1}, k)$) obtained in step ST5 into one file (encrypted file), and transmits the integrated encrypted file to the file sharing apparatus 10 (step ST6-1).

In the file sharing apparatus 10, the control unit 11 transfers the encrypted file to the file sharing unit 14. The file sharing unit 14 writes the encrypted file in the file storage unit 15 (step ST6-2).

In the file sharing apparatus 10, the control unit 11 notifies the client apparatus 20 that the file upload processing has been completed (step ST6-3).

In the client apparatus 20, the control unit 21 displays the notification on a display unit (not shown).

The file upload processing then ends.

FIGS. 6 and 7 show the procedure of the file download processing.

In the client apparatus 20, the control unit 21 transmits, to the file sharing apparatus 10, a file request including a member ID for identifying a member, a group ID for identifying a group (when files within a folder are shared by a group, a folder name may be used as a group ID), and the file name of the encrypted file (step ST11). Note that with respect to the member ID, if the client apparatus 20 sends a session ID instead of the member ID, the control unit 11 of the file sharing apparatus 10 may manage session IDs and member IDs in association with each other, and derive the member ID by performing an inverse operation based on the session ID using the managed member IDs.

In step ST12, steps ST12-1 and ST12-2 to be described below are executed.

In the file sharing apparatus 10, upon receiving the file request including the member ID for identifying the member and the file name of the encrypted file from the client apparatus 20, the control unit 11 acquires the encrypted file from the file storage unit 15 via the file sharing unit 14 based on the file name included in the file request. More specifically, the control unit 11 sends the file request received from the client apparatus 20 to the file sharing unit 14. The file sharing unit 14 acquires the encrypted file from the file storage unit 15, and transfers it to the control unit 11 (step ST12-1).

In the file sharing apparatus 10, the control unit 11 transfers the acquired encrypted file to the insertion processing unit 13 [insertion of processing] (step ST12-2).

In the file sharing apparatus 10, the insertion processing unit 13 separates the transferred encrypted file into the first encrypted symmetric key portion ($E(pk_{Gr1}, k)$) and the encrypted data portion (E(k, D)) (step ST13).

Steps ST14' and ST14 are parallelly executed. In step ST14', steps ST14'-1 and ST14'-2 to be described below are executed.

In the file sharing apparatus 10, the insertion processing unit 13 transfers the encrypted data portion (E(k, D)) to the control unit 11 simultaneously with the processing in step ST14 (step ST14'-1).

In the file sharing apparatus 10, the control unit 11 transmits the encrypted data portion (E(k, D)) to the client apparatus 20 (step ST14'-2).

In step ST14, steps 14-1 to ST14-5 to be described below are executed.

In the file sharing apparatus 10, simultaneously with the processing of transmitting the separated encrypted data portion (E(k, D)) to the client apparatus 20, the insertion processing unit 13 transmits a re-encryption request including the first encrypted symmetric key portion ($E(pk_{Gr1}, k)$), and the member ID and group ID included in the file request to the re-encryption apparatus 30 (step ST14-1).

Upon receiving the re-encryption request from the file sharing apparatus 10, the re-encryption apparatus 30 acquires the re-encryption key $rk_{Gr1 \rightarrow A}$ from the re-encryption key storage unit 35 based on the member ID (for example, A) and the group ID (for example, Gr1) Which are included in the re-encryption request, and re-encrypts the first encrypted symmetric key portion ($E(pk_{Gr1}, k)$) included in the re-encryption request to a second encrypted symmetric key portion ($E(pk_A, k)$) based on the acquired re-encryption key $rk_{Gr1 \rightarrow A}$.

More specifically, the control unit 31 transfers, to the re-encryption processing unit 33, the first encrypted symmetric key portion ($E(pk_{Gr1}, k)$), the member ID (for example, A), and the group ID (for example, Gr1) which are included in the re-encryption request. The re-encryption processing unit 33 acquires the re-encryption key $rk_{Gr1 \rightarrow A}$ from the re-encryption key storage unit 35 based on the member ID and the group ID, re-encrypts the first encrypted symmetric key portion ($E(pk_{Gr1}, k)$) to the second encrypted symmetric key portion ($E(pk_A, k)$), and transfers the obtained second encrypted symmetric key portion (E(pk$_A$, k)) to the control unit 31 (step ST14-2).

In the re-encryption apparatus 30, the control unit 31 transmits the second encrypted symmetric key portion (E(pk$_A$, k)) obtained by the re-encryption processing to the file sharing apparatus 10 (step ST14-3).

In the file sharing apparatus 10, if the transmission processing in step S14'-2 is not complete, the insertion processing unit 13 waits for completion of the transmission processing, and then transfers the second encrypted symmetric key portion (E(pk$_A$, k)) to the control unit 11. If the transmission processing in step ST14'-2 is complete, the insertion processing unit 13 directly transfers the second encrypted symmetric key portion (step ST14-4).

In the file sharing apparatus 10, the control unit 11 transmits the second encrypted symmetric key portion (E(pk$_A$, k)) to the client apparatus 20 [end of insertion processing] (step ST14-5).

Although a response from the file sharing apparatus 10 to client apparatus 20 is transmitted twice in steps ST14-5 and ST14'-2, the data are sent in two steps as one communication operation response.

The client apparatus 20 obtains the data D of the file by obtaining the symmetric key k by decrypting the second encrypted symmetric key portion (E(pk$_A$, k)) from the file sharing apparatus 10 based on the private key sk$_A$ corresponding to the public key pk$_A$ of the member, and decrypting the encrypted data portion (E(k, D)) from the file sharing apparatus 10 based on the obtained symmetric key k.

More specifically, in the client apparatus 20, the control unit 21 acquires the private key sk$_A$ from the private key storage unit 24, and transfers the private key sk$_A$ and the second encrypted symmetric key portion (E(pk$_A$, k)) to the encryption processing unit 25. The encryption processing unit 25 decrypts the second encrypted symmetric key portion (E(pk$_A$, k)) using the private key sk$_A$, and transfers the obtained symmetric key k to the control unit 21 (step ST15).

In the client apparatus 20, the control unit 21 transfers the second encrypted data portion (E(k, D)) received in step ST14' and the symmetric key k obtained in step ST15 to the encryption processing unit 25. The encryption processing unit 25 decrypts the second encrypted data portion using the symmetric key k, thereby obtaining the plaintext data D of the file. The file of the data D is transferred to the control unit 21 (step ST16).

The file download processing then ends.

Figure 8:
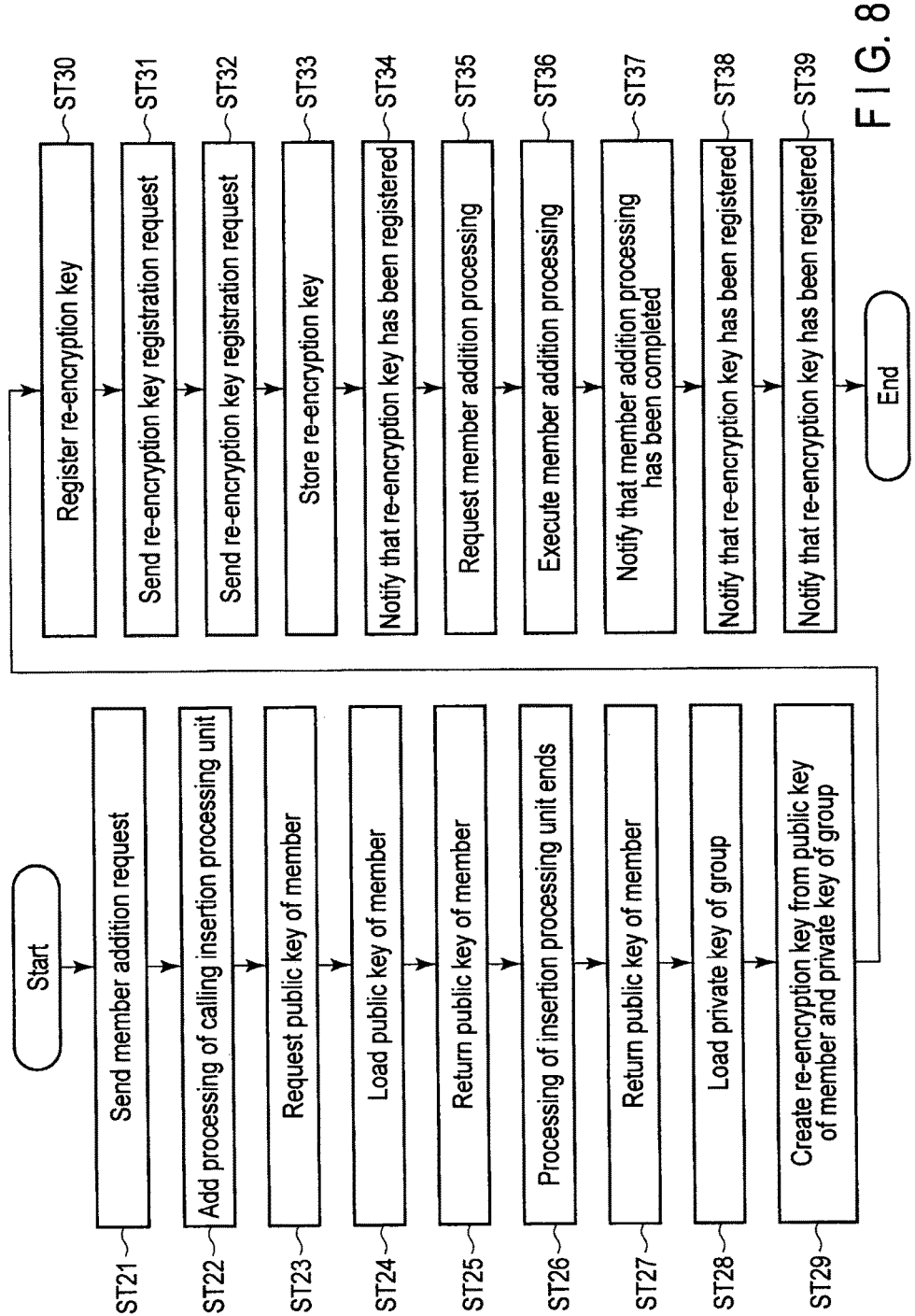
FIG. 8 is a flowchart for explaining member addition processing according to the first embodiment.
Figure 9:
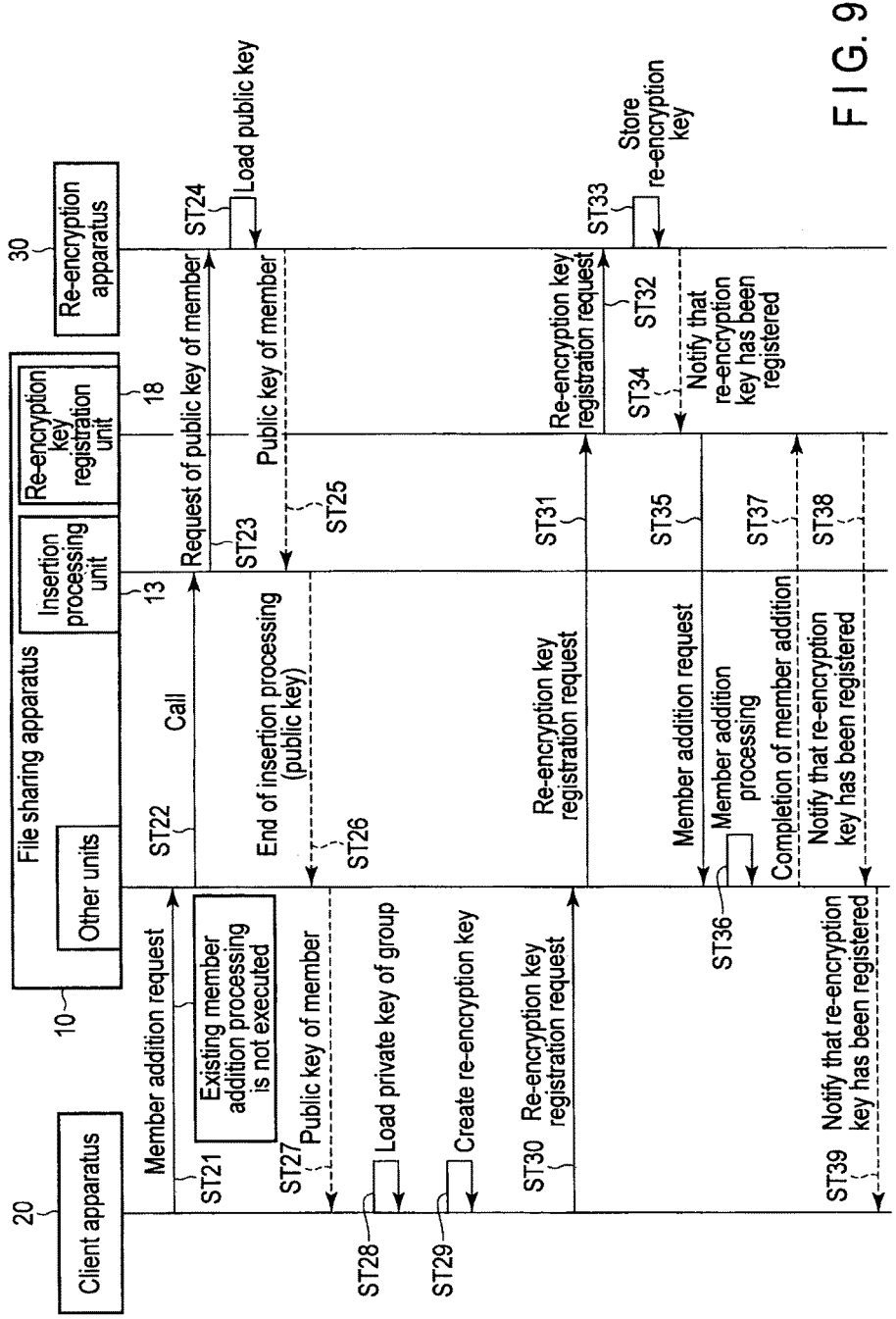
FIG. 9 is a sequence chart for explaining the member addition processing according to the first embodiment.

FIGS. 8 and 9 show the procedure of the processing of adding a member to the group. Assume that the client apparatus 20 is used by the group administrator.

In the client apparatus 20, the control unit 21 transmits, to the file sharing apparatus 10, a member addition request including a member ID (for example, C) for identifying a member to be added (step ST21).

In the file sharing apparatus 10, upon receiving the member addition request, the control unit 11 calls the insertion processing unit 13 [insertion of processing] (step ST22).

In the file sharing apparatus 10, the insertion processing unit 13 requests, of the re-encryption apparatus 30, the public key pk$_C$ of the member based on the member ID (C) included in the member addition request (step ST23).

In the re-encryption apparatus 30, the control unit 31 loads the public key pk$_C$ associated with the requested member ID (C) from the public key storage unit 34 (step ST24).

In the re-encryption apparatus 30, the control unit 31 returns the public pk$_C$ of the member and the member ID (C) to the insertion processing unit 13 of the file sharing apparatus 10 (step ST25).

In the file sharing apparatus 10, the insertion processing unit 13 returns the process to the control unit 11 (also transfers the acquired public key pk$_C$ of the member and the member ID (C)) [end of insertion processing] (step ST26).

In the file sharing apparatus 10, the control unit 11 transmits the public key pk$_C$ of the member and the member ID (C) to the client apparatus 20 (step ST27).

The existing function unit is originally configured to perform the member addition processing in step ST36 upon receiving a member addition request, but is configured not to perform the member addition processing by providing the function of the insertion processing unit 13.

In the client apparatus 20, the control unit 21 loads the private key sk$_{Gr1}$ of the group from the private key storage unit 24 (step ST28).

In the client apparatus 20, the control unit 21 transfers the public key pk$_C$ of the member and the private key sk$_{Gr1}$ of the group to the re-encryption key creation unit 27. The re-encryption key creation unit 27 creates a re-encryption key rk$_{Gr1 \to C}$ of the member from the public key pk$_C$ of the member and the private key sk$_{Gr1}$ of the group, and transfers the re-encryption key rk$_{Gr1 \to C}$ of the member and the member ID (C) to the control unit 21 (step ST29).

In the client apparatus 20, the control unit 21 transmits the re-encryption key rk$_{Gr1 \to C}$ of the member, the member ID (C), and the group ID (Gr1) to the file sharing apparatus 10 (step ST30).

In the file sharing apparatus 10, the control unit 11 transfers the re-encryption key rk$_{Gr1 \to C}$ of the member, the member ID (C), and the group ID (Gr1) to the re-encryption key registration unit 18 (step ST31).

In the file sharing apparatus 10, the insertion processing unit 13 transfers the re-encryption key rk$_{Gr1 \to C}$ and the member ID (C) to the re-encryption apparatus 30 (step ST32).

In the re-encryption apparatus 30, the control unit 31 writes the re-encryption key rk$_{Gr1 \to C}$ and the member ID (C) in the re-encryption key storage unit 35 in association with each other (step ST33).

In the re-encryption apparatus 30, the control unit 31 notifies the file sharing apparatus 10 that the re-encryption key rk$_{Gr1 \to C}$ has been registered in association with the member ID (C) and the group ID (Gr1) (step ST34).

In the file sharing apparatus 10, upon receiving the notification, the re-encryption key registration unit 18 sends a member addition request including the member ID (C) and the group ID (Gr1) to the group management unit 19 (step ST35).

In the file sharing apparatus 10, upon receiving the member addition request, the group management unit 19 adds the member ID (C) and the group ID (Gr1) to the group information in the group information storage unit 16 (step ST36).

Note that the member addition processing is performed using the re-encryption key registration request so as not to cause inconsistency to occur between the group information storage unit 16 of the file sharing apparatus 10 and the re-encryption key storage unit 35 of the re-encryption apparatus 30.

In the file sharing apparatus 10, the file sharing unit 14 notifies the re-encryption key registration unit 18 that the member addition processing has been completed (step ST37).

In the file sharing apparatus 10, the re-encryption key registration unit 18 notifies the control unit 11 that the re-encryption key $rk_{Gr1 \to C}$ corresponding to the member ID (C) and group ID (Gr1) has been registered (step ST38).

In the file sharing apparatus 10, the control unit 11 notifies the client apparatus 20 that the re-encryption key $rk_{Gr1 \to C}$ corresponding to the member ID (C) and group ID (Gr1) has been registered (step ST39).

In the client apparatus 20, the control unit 21 displays the notification on the display unit (not shown).

The member addition processing then ends.

FIGS. 10 and 11 show the procedure of the processing of deleting a member from the group. Assume that the client apparatus 20 is used by the group administrator.

In the client apparatus 20, the control unit 21 transmits, to the file sharing apparatus 10, a member deletion request including a member ID (for example, C) for identifying a member to be deleted and a group ID (for example, Gr1) for identifying a group from which the member is deleted (step ST41).

In the file sharing apparatus 10, upon receiving the member deletion request, the control unit 11 calls the insertion processing unit 13 [insertion of processing] (step ST42).

In the file sharing apparatus 10, the insertion processing unit 13 transmits a re-encryption key deletion request including the member ID (C) and group ID (Gr1) of the member deletion request to the re-encryption apparatus 30 (step ST43).

In the re-encryption apparatus 30, the control unit 31 deletes the re-encryption key $rk_{Gr1 \to C}$ associated with the member ID (C) and group ID (Gr1) from the re-encryption key storage unit 35 based on the member ID (C) included in the re-encryption key deletion request (step ST44).

In the re-encryption apparatus 30, the control unit 31 notifies the file sharing apparatus 10 that the re-encryption key $rk_{Gr1 \to C}$ associated with the member ID (C) and group ID (Gr1) has been deleted (step ST45).

In the file sharing apparatus 10, upon receiving the notification, the insertion processing unit 13 returns the process to the control unit 11 [end of insertion of processing] (step ST46).

In the file sharing apparatus 10, the control unit 11 sends a member deletion request including the member ID (C) and group ID (Gr1) to the group management unit 19 based on the notification. Upon receiving the member deletion request, the group management unit 19 deletes a row associated with the member ID (C) and group ID (Gr1) from the group information in the group information storage unit 16 (step ST47).

In the file sharing apparatus 10, the control unit 11 notifies the client apparatus 20 that the member deletion processing has been completed (step ST48).

In the client apparatus 20, the control unit 21 displays the notification on the display unit (not shown).

The member deletion processing then ends.

As described above, according to this embodiment, the file sharing apparatus 10 acquires an encrypted file from the file storage unit 15 based on a file request received from the client apparatus 20, and separates the encrypted file into a first encrypted symmetric key portion and an encrypted data portion. Simultaneously with processing of transmitting the encrypted data portion to the client apparatus 20, the file sharing apparatus 10 transmits a re-encryption request including the first encrypted symmetric key portion and a member ID to the re-encryption apparatus 30. The re-encryption apparatus 30 acquires a re-encryption key from the re-encryption key storage unit 35 based on the re-encryption request, re-encrypts the first encrypted symmetric key portion of the re-encryption request to a second encrypted symmetric key portion based on the re-encryption key, and transmits the second encrypted symmetric key portion to the client apparatus 20 via the file sharing apparatus 10. With this arrangement, the client apparatus 20 obtains data by obtaining a symmetric key by decrypting the second encrypted symmetric key portion based on a private key corresponding to the public key of a member, and decrypting the encrypted data portion based on the obtained symmetric key, thereby allowing the convenience and security to be compatible.

Furthermore, according to this embodiment, the file sharing apparatus 10 can cooperate with the re-encryption apparatus 30 by using the filter function without modifying a portion which provides the function of the existing file sharing system, thereby reducing the modification cost.

In addition, it is possible to shorten the communication time when the file sharing apparatus 10 separates hybrid encrypted data since only a key portion is sent to the re-encryption apparatus. By performing re-encryption processing simultaneously with transmission of a data portion, it is possible to reduce an increase in processing time by the re-encryption processing. Since the re-encryption apparatus 30 is additionally prepared, the re-encryption processing can be added without imposing a CPU load on the existing file sharing apparatus.

The difference between this embodiment and patent literature 1 will be supplementarily explained.

In this embodiment, by separating a symmetric key portion from a data portion in the hybrid scheme, and performing re-encryption processing for the symmetric key portion while sending the data portion to the client apparatus, as shown in FIG. 23, an attempt to reduce a decrease in service level caused by the time required for the re-encryption processing is made.

To the contrary, in a technique described in patent literature 1, when a client terminal performs encryption processing for a SOAP message, data is divided into a body portion and header portion, the encryption processing is performed for the body portion while transmitting the body portion to a gateway, and the header portion is created. In the technique described in patent literature 1, the header portion is transmitted to the gateway after transmission of the body portion, and the gateway creates the original SOAP message. Note that in the technique described in patent literature 1, transmission of data and encryption processing are parallelly performed in terms of only the processing of the client terminal. Therefore, the contents of the technique look similar to those of this embodiment, but the arrangement and function of the technique are different from those of this embodiment in the following points.

(1) In the technique described in patent literature 1, since the gateway cannot transmit data to the target server unless the body portion and header portion are prepared, the overall processing of the client terminal is reduced by parallelly performing encryption processing and data transmission in the client terminal. However, the technique described in patent literature 1 is different from this embodiment in that the data transmission time required to send data from the gateway to the server cannot be shortened, the time required to form a SOAP message cannot be shortened, and the gateway apparatus needs to be constructed according to the contents of another invention. Furthermore, whether the technique described in patent literature 1 can reduce the load on the whole system depends on the performance of the client terminal for executing encryption processing.

(2) In the technique described in patent literature 1, the encryption processing can be executed by only the client terminal and it is impossible to delegate the encryption processing to the gateway. The technique described in patent literature 1, therefore, cannot reduce the load of the encryption processing on the client terminal.

With respect to the above points (1) and (2), in this embodiment, since there is no processing corresponding to message forming processing, processing corresponding to the function of the gateway is not necessary and it is possible to delegate the encryption processing to an external device, thereby reducing the load on the whole system. Furthermore, since it is not necessary to form a message and it is possible to delegate the encryption processing in this embodiment, the arrangement and function of this embodiment are different from those of the technique described in patent literature 1.

Second Embodiment

A re-encryption system according to the second embodiment will be described with reference to FIG. 1.

As shown in FIG. 18, the second embodiment is a basic mode in which no hybrid scheme is used, and shows an arrangement of encrypting and re-encrypting a file as a whole.

As described above with reference to FIG. 1, the re-encryption system has a client/server arrangement, and includes a file sharing apparatus 10 and a re-encryption apparatus 30, which are communicable with a client apparatus 20 operated by a member belonging to a group. Note that since no symmetric key k is used, the symmetric key generation unit 26 of the client apparatus 20 is omitted. Other components of the client apparatus 20 are as explained in the following description of their operations.

A file storage unit 15 of the file sharing apparatus 10 stores a first encrypted file $E(pk_{Gr1}, D)$ obtained by encrypting a file (D) based on a public key $pk_{Gr1}$ of the group. The file sharing apparatus 10 has, for example, functions (f10-1) to (f10-3) below which are associated with file download processing.

(f10-1) When a control unit 11 and a communication unit 12 are caused to receive a file request including a member ID (for example, A) for identifying a member, a group ID (for example, Gr1), and the file name of the first encrypted file $E(pk_{Gr1}, D)$ from the client apparatus 20, the control unit 11 and a file sharing unit 14 are caused to acquire the first encrypted file $E(pk_{Gr1}, D)$ from the file storage unit 15 based on the file name included in the file request.

(f10-2) The control unit 11, the communication unit 12, and an insertion processing unit 13 are caused to transmit a re-encryption request including the acquired first encrypted file $E(pk_{Gr1}, D)$ and the member ID (A) and group ID (Gr1) of the file request to the re-encryption apparatus 30.

(f10-3) When the control unit 11, the communication unit 12, and the insertion processing unit 13 are caused to receive, from the re-encryption apparatus 30, a second encrypted file $E(pk_A, D)$ obtained by encrypting a file based on a public key $Pk_A$ of the group ID (Gr1) and the member ID (A), the control unit 11 and the communication unit 12 are caused to transmit the second encrypted file $E(pk_A, D)$ to the client apparatus.

Other components of the file sharing apparatus 10 (components associated with file upload, member addition processing, and member deletion processing) are as explained in the following description of their operations.

A re-encryption key storage unit 35 of the re-encryption apparatus 30 stores, in association with each other, member IDs (A, B, . . . ) for identifying members and group IDs (Gr1, Gr2, . . . ) for identifying groups, and re-encryption keys ($rk_{Gr1 \to A}$, $rk_{Gr1 \to B}$, . . . ) for encrypting, without decrypting, the first encrypted file to the second encrypted file. The re-encryption apparatus 30 has, for example, functions (f30-1) to (f30-3) below which are associated with, for example, file download processing.

(f30-1) When a control unit 31 and a communication unit 32 are caused to receive a re-encryption request from the file sharing apparatus 10, the control unit 31 and a re-encryption processing unit 33 are caused to acquire the re-encryption key $rk_{Gr1 \to A}$ from the re-encryption key storage unit 35 based on the member ID (for example, A) and group ID (for example, Gr1) included in the re-encryption request.

(f30-2) The re-encryption processing unit 33 is caused to re-encrypt the first encrypted file $E(pk_{Gr1}, D)$ included in the re-encryption request to the second encrypted file $E(pk_A, D)$ based on the acquired re-encryption key $rk_{Gr1 \to A}$.

(f30-3) The control unit 31 and the communication unit 32 are caused to transmit the second encrypted file $E(pk_A, D)$ obtained by the re-encryption processing to the file sharing apparatus 10.

Other components of the re-encryption apparatus 30 (components associated with the file upload, member addition processing, and member deletion processing) are as explained in the following description of their operations.

The operation of the re-encryption system having the above-described arrangement will be described next.

The procedure of the file upload processing will be explained first.

In the client apparatus 20, a control unit 21 loads, from a file storage unit 23, a file (D) to be uploaded.

In the client apparatus 20, the control unit 21 requests, of the file sharing apparatus 10, the public key $pk_{Gr1}$ of the group to which the file to be uploaded will be published. More specifically, the control unit 21 transmits a public key request including the group ID (for example, Gr1) for identifying the group to the file sharing apparatus 10.

In the file sharing apparatus 10, the control unit 11 sends the public key request to a public key acquisition unit 17.

In the file sharing apparatus 10, the public key acquisition unit 17 transmits the public key request to the re-encryption apparatus 30.

In the re-encryption apparatus 30, the control unit 31 extracts the public key $pk_{Gr1}$ of the group from a public key storage unit 34 based on the group ID (for example, Gr1) included in the public key request.

In the re-encryption apparatus 30, the control unit 31 transmits the public key $pk_{Gr1}$ of the group to the file sharing apparatus 10.

In the file sharing apparatus 10, the public key acquisition unit 17 transfers the public key $pk_{Gr1}$ of the group to the control unit 11.

In the file sharing apparatus 10, the control unit 11 transmits the public key $pk_{Gr1}$ of the group to the client apparatus 20.

In the client apparatus 20, the control unit 21 transfers, to an encryption processing unit 25, the received public key $pk_{Gr1}$ of the group and the file to be uploaded. The encryption processing unit 25 encrypts the file (D) using the public key $pk_{Gr1}$ of the group, and transfers a thus obtained first encrypted file $E(pk_{Gr1}, D)$ to the control unit 21.

In the client apparatus 20, the control unit 21 transmits the first encrypted file E(pk$_{Gr1}$, D) to the file sharing apparatus 10.

In the file sharing apparatus 10, the control unit 11 transfers the first encrypted file E(pk$_{Gr1}$, D) to the file sharing unit 14. The file sharing unit 14 writes the first encrypted file E(pk$_{Gr1}$, D) in the file storage unit 15.

In the file sharing apparatus 10, the control unit 11 notifies the client apparatus 20 that the file upload processing has been completed.

In the client apparatus 20, the control unit 21 displays the notification on a display unit (not shown).

The file upload processing then ends.

The procedure of the file download processing will be described next.

In the client apparatus 20, the control unit 21 transmits, to the file sharing apparatus 10, a file request including a member ID (for example, A) for identifying a member, a group ID (for example, Gr1) for identifying a group, and the file name of the first encrypted file E(pk$_{Gr1}$, D).

In the file sharing apparatus 10, upon receiving the file request from the client apparatus 20, the control unit 11 acquires the first encrypted file E(pk$_{Gr1}$, D) from the file storage unit 15 via the file sharing unit 14 based on the file name included in the file request. More specifically, the control unit 11 sends the file request received from the client apparatus 20 to the file sharing unit 14. The file sharing unit 14 acquires the first encrypted file E(pk$_{Gr1}$, D) from the file storage unit 15, and transfers it to the control unit 11.

In the file sharing apparatus 10, the control unit 11 transfers the acquired first encrypted file E(pk$_{Gr1}$, D) to the insertion processing unit 13 [start of insertion processing].

In the file sharing apparatus 10, the insertion processing unit 13 transmits a re-encryption request including the transferred first encrypted file E(pk$_{Gr1}$, D) and the member ID included in the file request to the re-encryption apparatus 30.

Upon receiving the re-encryption request from the file sharing apparatus 10, the re-encryption apparatus 30 acquires a re-encryption key rk$_{Gr1 \rightarrow A}$ from the re-encryption key storage unit 35 based on the member ID (for example, A) and the group ID (for example, Gr1) which are included in the re-encryption request, and re-encrypts the first encrypted file (E(pk$_{Gr1}$, D) included in the re-encryption request to a second encrypted file (E(pk$_A$, D) based on the acquired re-encryption key rk$_{Gr1 \rightarrow A}$.

More specifically, the control unit 31 transfers the first encrypted file E(pk$_{Gr1}$, D), the member ID (for example, A), and the group ID (for example, Gr1) which are included in the re-encryption request to the re-encryption processing unit 33. The re-encryption processing unit 33 acquires the re-encryption key rk$_{Gr1 \rightarrow A}$ from the re-encryption key storage unit 34 based on the member ID, re-encrypts the first encrypted file E(pk$_{Gr1}$, D) to the second encrypted file E(pk$_A$, D), and transfers the obtained second encrypted file E(pk$_A$, D) to the control unit 31.

In the re-encryption apparatus 30, the control unit 31 transmits the second encrypted file E(pk$_A$, D) obtained by the re-encryption processing to the file sharing apparatus 10.

In the file sharing apparatus 10, the insertion processing unit 13 transfers the second encrypted file E(pk$_A$, D) to the control unit 11.

In the file sharing apparatus 10, the control unit 11 transmits the second encrypted file E(pk$_A$, D) to the client apparatus 20 [end of insertion processing].

The client apparatus 20 obtains the file (D) by decrypting the second encrypted file E(pk$_A$, D) from the file sharing apparatus 10 based on a private key sk$_A$ corresponding to the public key pk$_A$ of the member.

More specifically, in the client apparatus 20, the control unit 21 acquires the private key sk$_A$ from the private key storage unit 24, and transfers the private key sk$_A$ and the second encrypted file E(pk$_A$, D) to the encryption processing unit 25. The encryption processing unit 25 decrypts the second encrypted file E(pk$_A$, D) using the private key sk$_A$, and transfers the thus obtained file (D) to the control unit 21.

The file download processing then ends.

Note that the member addition processing and the member deletion processing are the same as those in the first embodiment.

According to the above-described embodiment, the file sharing apparatus 10 acquires the first encrypted file from the file storage unit 15 based on a file request received from the client apparatus 20, and transmits a re-encryption request including the first encrypted file to the re-encryption apparatus 30. The re-encryption apparatus 30 acquires a re-encryption key from the re-encryption key storage unit 35 based on the re-encryption key, re-encrypts the first encrypted file included in the re-encryption request to the second encrypted file based on the re-encryption key, and transmits the second encrypted file to the client apparatus 20 via the file sharing apparatus 10. The client apparatus 20 obtains the file by decrypting the second encrypted file based on a private key corresponding to the public key of the member. With this arrangement, the whole first encrypted file is re-encrypted. It is, therefore, possible to obtain the same effects as those in the first embodiment except that the processing time is longer than in the first embodiment.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to each embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each embodiment on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A re-encryption system comprising:
a file sharing apparatus and a re-encryption apparatus which are communicable with a client apparatus operated by a member belonging to a group, wherein the re-encryption apparatus is distinct and separate from the client apparatus and the file sharing apparatus,
the file sharing apparatus comprising
a file storage device on a cloud which stores an encrypted file including a first encrypted symmetric key portion obtained by encrypting a symmetric key based on a public key of the group and an encrypted data portion obtained by encrypting data based on the symmetric key, and
circuitry of
a first device which acquires, upon receiving a file request including a member ID for identifying the member and a file name of the encrypted file from the client apparatus, the encrypted file from the file storage device based on the file name included in the file request,
a second device which separates the acquired encrypted file into the first encrypted symmetric key portion and the encrypted data portion,
a third device which transmits a re-encryption request including the first encrypted symmetric key portion and the member ID included in the file request to the re-encryption apparatus simultaneously with encrypted data transmission processing which transmits the separated encrypted data portion to the client apparatus, and
a fourth device which transmits, upon receiving a second encrypted symmetric key portion obtained by encrypting the symmetric key based on a public key of the member ID from the re-encryption apparatus simultaneously with the encrypted data transmission processing, the second encrypted symmetric key portion to the client apparatus after the encrypted data transmission processing, and
the re-encryption apparatus comprising
a re-encryption key storage device which stores the member ID for identifying the member and a re-encryption key for re-encrypting, without decrypting, the first encrypted symmetric key portion into the second encrypted symmetric key portion in association with the member ID and the re-encryption key, and
circuitry of
a device which acquires, upon receiving the re-encryption request from the file sharing apparatus, the re-encryption key from the re-encryption key storage device based on the member ID included in the re-encryption request,
a device which performs re-encryption by re-encrypting the first encrypted symmetric key portion included in the re-encryption request to the second encrypted symmetric key portion based on the acquired re-encryption key, and
a device which transmits the second encrypted symmetric key portion obtained by the re-encryption to the file sharing apparatus,
wherein the client apparatus obtains the data requested by the file request by obtaining the symmetric key by decrypting the second encrypted symmetric key portion from the file sharing apparatus based on a private key corresponding to a public key of the member, and decrypting the encrypted data portion from the file sharing apparatus based on the obtained symmetric key.

2. The re-encryption system according to claim 1, wherein the first device, the second device, the third device, and the fourth device are implemented using a filter function which adds predetermined processing.

3. A re-encryption apparatus comprising:
circuitry configured to communicate with a file sharing apparatus which is communicable with a client apparatus operated by a member belonging to a group, wherein the re-encryption apparatus is distinct and separate from the client apparatus and the file sharing apparatus, wherein the file sharing apparatus further
stores, in a memory on a cloud, an encrypted file including a first encrypted symmetric key portion obtained by encrypting a symmetric key based on a public key of the group and an encrypted data portion obtained by encrypting data based on the symmetric key,
executes first processing which acquires, upon receiving a file request including a member ID for identifying the member and a file name of the encrypted file from the client apparatus, the encrypted file from the memory based on the file name included in the file request,
executes second processing which separates the acquired encrypted file into the first encrypted symmetric key portion and the encrypted data portion,
executes third processing which transmits a re-encryption request including the first encrypted symmetric key portion and the member ID included in the file request to the re-encryption apparatus simultaneously with encrypted data transmission processing which transmits the separated encrypted data portion to the client apparatus, and
executes fourth processing which transmits, upon receiving a second encrypted symmetric key portion obtained by encrypting the symmetric key based on a public key of the member ID from the re-encryption apparatus simultaneously with the encrypted data transmission processing, the second encrypted symmetric key portion to the client apparatus after the encrypted data transmission processing,
wherein the re-encryption apparatus further comprises:
a re-encryption key storage device which stores the member ID for identifying the member and a re-encryption key for re-encrypting, without decrypting, the first encrypted symmetric key portion into the second encrypted symmetric key portion in association with the member ID and the re-encryption key, and
circuitry of
a device which acquires, upon receiving the re-encryption request from the file sharing apparatus, the re-encryption key from the re-encryption key storage device based on the member ID included in the re-encryption request, a device which performs re-encryption by re-encrypting the first encrypted symmetric key portion included in the re-encryption request to the second encrypted symmetric key portion based on the acquired re-encryption key, and a device which transmits the second encrypted symmetric key portion obtained by the re-encryption to the file sharing apparatus, wherein the client apparatus obtains the data requested by the file request by obtaining the symmetric key by decrypting the second encrypted symmetric key portion from the file sharing apparatus based on a private key corresponding to a public key of the member, and decrypting the encrypted data portion from the file sharing apparatus based on the obtained symmetric key.

4. The re-encryption apparatus according to claim 3, wherein the first processing, the second processing, the third processing, the encrypted data transmission processing, and fourth processing are executed by using a filter function which adds predetermined processing.

5. A non-transitory computer-readable storage medium having stored thereon computer-readable instructions which when executed by circuitry of a re-encryption apparatus including:

a re-encryption key storage device configured to communicate with a file sharing apparatus, wherein the re-encryption apparatus is distinct and separate from the client apparatus and the file sharing apparatus, and wherein the file sharing apparatus is communicable with the client apparatus operated by a member belonging to a group, stores on a cloud, in a memory, an encrypted file including a first encrypted symmetric key portion obtained by encrypting a symmetric key based on a public key of the group and an encrypted data portion obtained by encrypting data based on the symmetric key, executes first processing which acquires, upon receiving a file request including a member ID for identifying the member and a file name of the encrypted file from the client apparatus, the encrypted file from the memory based on the file name included in the file request, executes second processing which separates the acquired encrypted file into the first encrypted symmetric key portion and the encrypted data portion, executes third processing which transmits a re-encryption request including the first encrypted symmetric key portion and the member ID included in the file request to the re-encryption apparatus simultaneously with encrypted data transmission processing which transmits the separated encrypted data portion to the client apparatus, and executes fourth processing which transmits, upon receiving a second encrypted symmetric key portion obtained by encrypting the symmetric key based on a public key of the member ID from the re-encryption apparatus simultaneously with the encrypted data transmission processing, the second encrypted symmetric key portion to the client apparatus after the encrypted data transmission processing, and causes the circuitry to perform a method comprising:

processing of writing the member ID for identifying the member and a re-encryption key for re-encrypting, without decrypting, the first encrypted symmetric key portion into the second encrypted symmetric key portion in the re-encryption key storage device in association with the member ID and the re-encryption key;

acquiring, upon receiving the re-encryption request from the file sharing apparatus, the re-encryption key from the re-encryption key storage device based on the member ID included in the re-encryption request;

performing re-encryption by executing processing of re-encrypting the first encrypted symmetric key portion included in the re-encryption request to the second encrypted symmetric key portion based on the acquired re-encryption key; and processing of transmitting the second encrypted symmetric key portion obtained by the re-encryption to the file sharing apparatus, and wherein the client apparatus obtains the data requested by the file request by obtaining the symmetric key by decrypting the second encrypted symmetric key portion from the file sharing apparatus based on a private key corresponding to a public key of the member, and decrypting the encrypted data portion from the file sharing apparatus based on the obtained symmetric key.

6. The non-transitory computer-readable storage medium according to claim 5, wherein the first processing, the second processing, the third processing, the encrypted data transmission processing, and fourth processing are executed by using a filter function which adds predetermined processing.

* * * * *